US012512912B2

United States Patent
Gui et al.

(10) Patent No.: US 12,512,912 B2
(45) Date of Patent: Dec. 30, 2025

(54) OPTICAL MODULE, PROCESSING COMPONENT, PLUG COMPONENT, SYSTEM, AND METHOD

(71) Applicant: HUAWEI TECHNOLOGIES CO., LTD., Guangdong (CN)

(72) Inventors: Tao Gui, Dongguan (CN); Yanzhao Lu, Dongguan (CN); Liangchuan Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 18/343,710

(22) Filed: Jun. 28, 2023

(65) Prior Publication Data

US 2023/0344519 A1 Oct. 26, 2023

Related U.S. Application Data

(63) Continuation of application No. PCT/CN2021/140322, filed on Dec. 22, 2021.

(30) Foreign Application Priority Data

Dec. 31, 2020 (CN) .......................... 202011637059.3

(51) Int. Cl.
*H04B 10/40* (2013.01)
*H04B 10/25* (2013.01)
*H04B 10/61* (2013.01)

(52) U.S. Cl.
CPC .......... *H04B 10/40* (2013.01); *H04B 10/615* (2013.01); *H04B 10/25* (2013.01)

(58) Field of Classification Search
None
See application file for complete search history.

(56) References Cited

U.S. PATENT DOCUMENTS 4,991,229 A * 2/1991 Nelson .................. H04B 10/50
398/20
5,777,761 A * 7/1998 Fee ..................... H04J 14/0295
398/1
(Continued)

FOREIGN PATENT DOCUMENTS

CN 107222263 A 9/2017
CN 109314579 A 2/2019
(Continued)

OTHER PUBLICATIONS

Jingchi Cheng et al: "A Comparative Study of Intradyne and Selfhomodyne Systems for Next Generation Intradatacenter Optical Interconnects",2019 24th Optoelectronics and Communications Conference (OECC) and 2019 International Conference on Photonics in Switching and Computing (PSC), The Institute of Electronics,Information and Communication Engineers Jul. 7, 2019,total 3 pages,XP033607807.
(Continued)

*Primary Examiner* — Darren E Wolf

(57) ABSTRACT

An optical module includes a processing component and a plug component. The plug component includes a plurality of filters. The plurality of filters are connected to a plurality of secondary ports. The processing component includes a plurality of primary ports. The optical module is in a first connection status or a second connection status. When the optical module is respectively in the first connection status or the second connection status, a wavelength of a second service optical signal or a wavelength of a second local oscillator optical signal that are sent by the plurality of filters varies. When the optical module is in a same connection status, wavelengths of the second service optical signal and the second local oscillator optical signal that are sent by the plurality of filters are identical.

20 Claims, 12 Drawing Sheets

(56) References Cited

U.S. PATENT DOCUMENTS

| | | | |
|---|---|---|---|
| 7,133,610 B1* | 11/2006 | Shimura | H04B 10/50575 398/198 |
| 10,050,713 B2 | 8/2018 | Li et al. | |
| 2002/0109876 A1* | 8/2002 | Eijk | H04Q 11/0066 398/58 |
| 2003/0185563 A1* | 10/2003 | Stephens | H04B 10/2507 359/25 |
| 2003/0215231 A1* | 11/2003 | Weston-Dawkes | H04J 14/0295 398/19 |
| 2011/0013907 A1* | 1/2011 | Sugihara | G02F 1/0123 398/38 |

FOREIGN PATENT DOCUMENTS

| | | |
|---|---|---|
| CN | 110247711 A | 9/2019 |
| CN | 110677198 A | 1/2020 |
| WO | 2017216836 A1 | 12/2017 |

OTHER PUBLICATIONS

Min Liu et al, "Multi-core fiber based coherent transceiver utilizing self-homodyne detection and ICA based channel equalization for optical intra-datacenter interconnects",Optik,Wissenschaftliche Verlag GMBH,DE, vol. 205, Jan. 18, 2020, total 7 pages, XP086137487.
Mohamed Morsy-Osman et al, "DSP-free 'coherent-lite' transceiver for next generation single wavelength optical intra-datacenter interconnects",Optics Express, vol. 26, No. 7, Apr. 2, 2018, total 14 pages, XP055671507.

\* cited by examiner

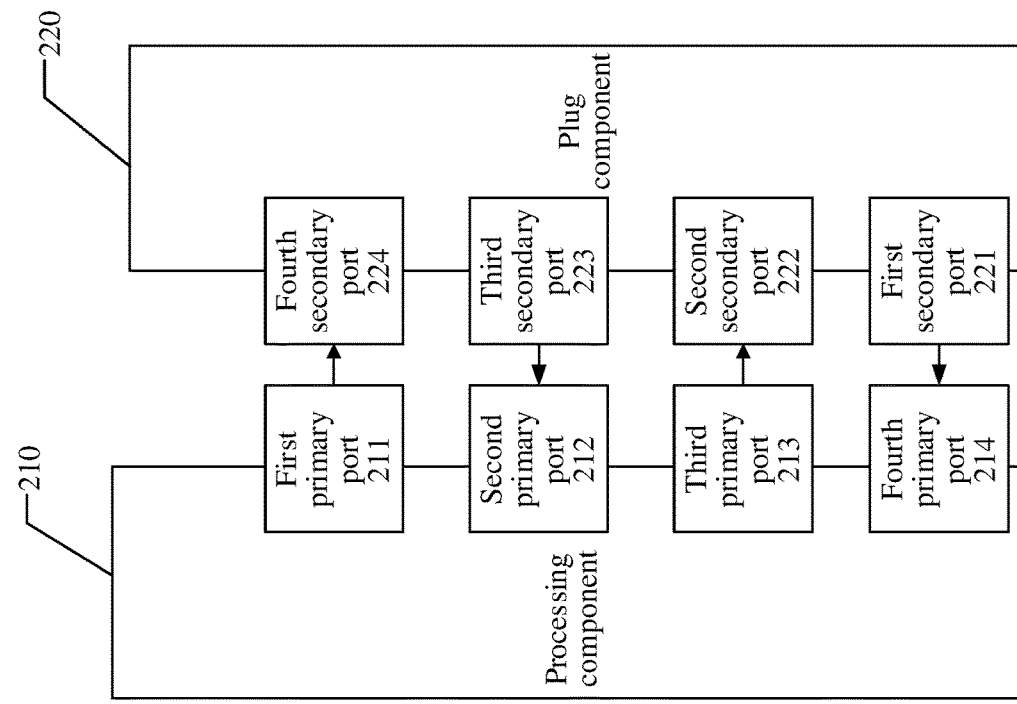
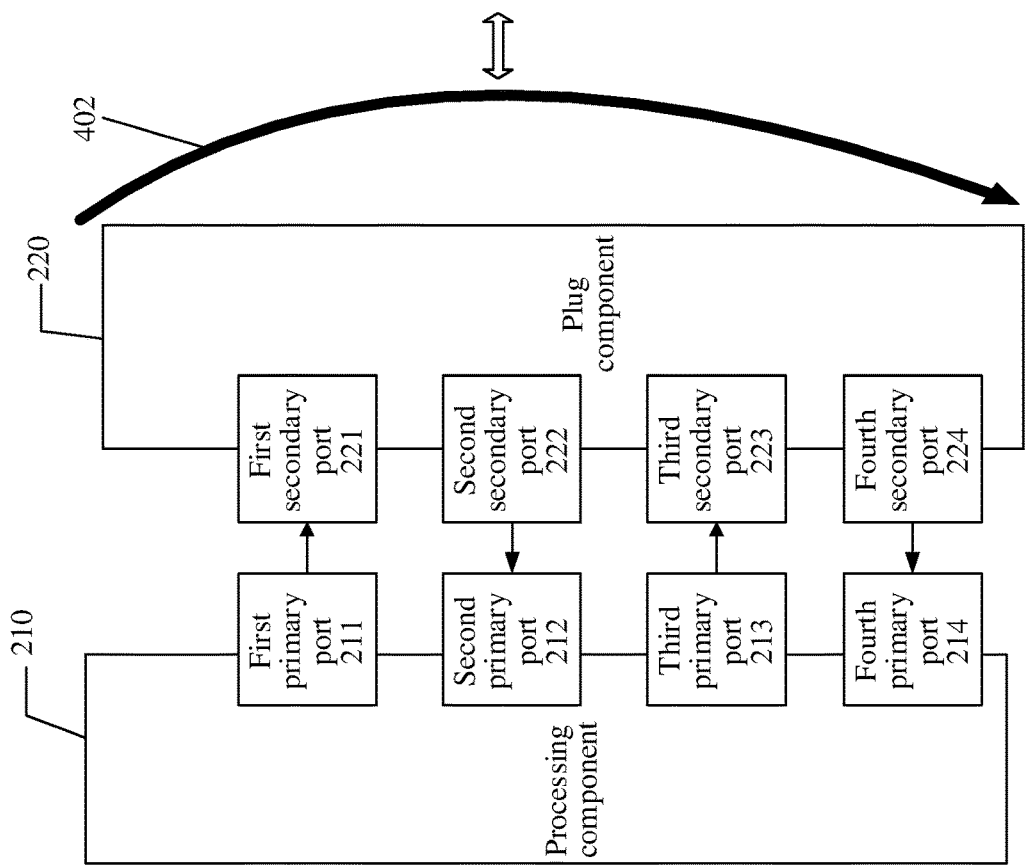
FIG. 4
FIG. 4a
FIG. 4b

OPTICAL MODULE, PROCESSING COMPONENT, PLUG COMPONENT, SYSTEM, AND METHOD

CROSS-REFERENCE TO RELATED APPLICATIONS

This application is a continuation of International Application No. PCT/CN2021/140322 filed on Dec. 22, 2021, which claims priority to Chinese Patent Application No. 202011637059.3 filed on Dec. 31, 2020. The disclosures of the aforementioned applications are hereby incorporated by reference in their entireties.

TECHNICAL FIELD

This disclosure relates to the field of communication technologies, and in particular, to an optical module, a processing component, a plug component, a system, and a method.

BACKGROUND

A same-source coherent bi-direction (BiDi) transmission technology provides a low-cost and low-power-consumption short-distance coherent transmission solution. Signals and local oscillator light are separately sent through two different optical fibers to a remote end to implement same-source coherent detection. This greatly reduces costs of light source and greatly reduces complexity of digital signal processing. It is a very competitive technology in optical interconnection applications in data centers. Same-source coherent bi-direction transmission supports bi-direction transmission between two optical modules (an optical module A and an optical module B shown in FIG. 1). Specifically, the optical module A performs coherent detection based on service light and local oscillator (LO) light from the optical module B, and the optical module B performs coherent detection based on service light and local oscillator light from the optical module A.

However, in a bi-direction transmission process, a wavelength of an optical signal sent by the optical module A to the optical module B is fixed (for example, 21), and a wavelength of an optical signal sent by the optical module B to the optical module A is also fixed (for example, 22). The optical module A and the optical module B are used in pairs. This increases difficulty in optical module manufacturing and reduces efficiency of optical module networking and maintenance.

SUMMARY

Embodiments of this disclosure provide an optical module, a processing component, a plug component, a system, and a method, all of which can effectively reduce difficulty of production of the optical module, and improve efficiency of networking and maintenance of the optical module.

According to a first aspect, an embodiment provides an optical module that includes a processing component and a plug component. The plug component includes a plurality of filters that are connected to a plurality of secondary ports. The processing component includes a plurality of primary ports. The optical module is in a first connection status or a second connection status. The first connection status and the second connection status are different statuses of connections between the plurality of primary ports and the plurality of secondary ports. A same primary port is connected to different secondary ports in the first connection status or in the second connection status. The plurality of filters are configured to send a first service optical signal and a first local oscillator optical signal from the processing component to a peer optical module. The plurality of filters are further configured to send a second service optical signal and a second local oscillator optical signal from the peer optical module to the processing component. The processing component is configured to perform coherent detection on the second service optical signal based on the second local oscillator optical signal. When the optical module is in different connection statuses, a wavelength of the first service optical signal sent by the plurality of filters varies. When the optical module is in different connection statuses, a wavelength of the first local oscillator optical signal sent by the plurality of filters varies. When the optical module is in a same connection status, wavelengths of the first service optical signal and the first local oscillator optical signal that are sent by the plurality of filters are identical. When the optical module is in different connection statuses, a wavelength of the second service optical signal sent by the plurality of filters varies. When the optical module is in different connection statuses, a wavelength of the second local oscillator optical signal sent by the plurality of filters varies. When the optical module is in a same connection status, wavelengths of the second service optical signal and the second local oscillator optical signal that are sent by the plurality of filters are identical.

Using the optical module as described in this aspect allows a wavelength of the optical module to be adjusted based on different networking requirements so that optical modules located at different locations can send optical signals having different wavelengths without replacing the optical modules. In addition, the processing component and the plug component are produced in batches when the optical module is delivered from a factory, and the produced processing component and the plug component do not need to be distinguished. In a networking process, optical modules of a same structure may use different connection statuses based on different wavelength requirements of sending and receiving signals. This effectively reduces the difficulty of production of an optical module.

After the networking of the optical module succeeds, if wavelengths of a service optical signal and a local oscillator optical signal that are sent by the optical module need to be changed, the optical module does not need to be replaced, and only a connection status of the optical module needs to be changed, thereby effectively improving a difficulty of maintaining the optical module and reducing maintenance costs.

Based on the first aspect, in an optional implementation, the plurality of primary ports include a first primary port, a second primary port, a third primary port, and a fourth primary port. The plurality of secondary ports include a first secondary port, a second secondary port, a third secondary port, and a fourth secondary port. The first connection status is that the first primary port is connected to the first secondary port, the second primary port is connected to the second secondary port, the third primary port is connected to the third secondary port, and the fourth primary port is connected to the fourth secondary port. The second connection status is that the first primary port is connected to the fourth secondary port, the second primary port is connected to the third secondary port, the third primary port is connected to the second secondary port, and the fourth primary port is connected to the first secondary port.

Different connection statuses shown in this aspect are different connection manners between the plurality of primary ports and the plurality of secondary ports, thereby improving efficiency of switching the optical module between the different connection statuses.

Based on the first aspect, in an optional implementation, the plug component includes a first filter and a second filter. The first filter is connected to the first secondary port and the second secondary port. The second filter is connected to the third secondary port and the fourth secondary port. The first filter is further connected to a first transmission port. The second filter is further connected to a second transmission port. The first transmission port and the second transmission port are separately connected to the peer optical module through an optical fiber.

It can be learned that, through the filter, the optical signal sent by the optical module to the peer optical module and the optical signal from the peer optical module can be filtered, thereby ensuring bi-direction communication between the optical module and the peer optical module.

Based on the first aspect, in an optional implementation, the first filter is configured to receive, through the first secondary port, a first optical signal having a first wavelength from the first primary port. The first filter is configured to send the first optical signal to the first transmission port. The first transmission port is configured to send the first optical signal to the peer optical module. The second filter is configured to receive, through the third secondary port, a second optical signal having the first wavelength from the third primary port. The second filter is further configured to send the second optical signal to the second transmission port. The second transmission port is configured to send the second optical signal to the peer optical module. In the first optical signal and the second optical signal, one channel of optical signals is the first service optical signal, and another channel of the optical signals is the first local oscillator optical signal.

Based on the first aspect, in an optional implementation, the second filter is configured to receive, through the fourth secondary port, a third optical signal having a second wavelength from the first primary port. The second filter is configured to send the third optical signal to the second transmission port. The second transmission port is configured to send the third optical signal to the peer optical module. The first filter is configured to receive, through the second secondary port, a fourth optical signal having the second wavelength from the third primary port. The first filter is further configured to send the fourth optical signal to the first transmission port. The first transmission port is configured to send the fourth optical signal to the peer optical module. In the third optical signal and the fourth optical signal, one channel of optical signals is the first service optical signal, and another channel of the optical signals is the first local oscillator optical signal.

Based on the first aspect, in an optional implementation, the first filter is configured to receive, through the first transmission port, a fifth optical signal having a second wavelength from the peer optical module. The first filter is configured to send the fifth optical signal to the second secondary port. The processing component is configured to receive the fifth optical signal from the second secondary port through the second primary port. The second filter is configured to receive, through the second transmission port, a sixth optical signal having the second wavelength from the peer optical module. The second filter is configured to send the sixth optical signal to the fourth secondary port. The processing component is configured to receive the sixth optical signal from the fourth secondary port through the fourth primary port. In the fifth optical signal and the sixth optical signal, one channel of optical signals is the second service optical signal, and another channel of the optical signals is the second local oscillator optical signal.

Based on the first aspect, in an optional implementation, the second filter is configured to receive, through the second transmission port, a seventh optical signal having a first wavelength from the peer optical module. The second filter is configured to send the seventh optical signal to the third secondary port. The processing component is configured to receive the seventh optical signal from the third secondary port through the second primary port. The first filter is configured to receive, through the first transmission port, an eighth optical signal having the first wavelength from the peer optical module. The first filter is configured to send the eighth optical signal to the first secondary port. The processing component is configured to receive the eighth optical signal from the first secondary port, through the fourth primary port. In the seventh optical signal and the eighth optical signal, one channel of optical signals is the second service optical signal, and another channel of the optical signals is the second local oscillator optical signal.

Based on the first aspect, in an optional implementation, the processing component includes a target laser, an optical splitter, a modulator, and a processor that are sequentially connected. The modulator is connected to one of the plurality of primary ports. The optical splitter is connected to one of the plurality of primary ports. The processor is connected to two primary ports in the plurality of primary ports. The primary port connected to the modulator, the primary port connected to the optical splitter, and the primary port connected to the processor are different from each other. The target laser is configured to send a to-be-split optical signal to the optical splitter. The optical splitter is configured to split the to-be-split optical signal to obtain the first local oscillator optical signal and a to-be-modulated optical signal. The optical splitter is further configured to send the first local oscillator optical signal to the primary port connected to the optical splitter. The modulator is configured to modulate a service signal on the to-be-modulated optical signal to obtain the first service optical signal. The modulator is further configured to send the first service optical signal to the primary port connected to the modulator. The processor is configured to separately receive the second service optical signal and the second local oscillator optical signal from the plug component through two primary ports connected to the processor. The processor is configured to perform the coherent detection on the second service optical signal based on the second local oscillator optical signal.

Based on the first aspect, in an optional implementation, the processing component includes a first laser and a second laser that are separately connected to the optical splitter. A first switch is connected between the first laser and the processor. A second switch is connected between the second laser and the processor. If the processing component and the plug component are connected through the first connection status, the processor is configured to control the first switch to enable a path between the first laser and the processor, and the processor is further configured to control the second switch to disable the path between the second laser and the processor. The first laser as the target laser is configured to emit the to-be-split optical signal having the first wavelength. If the processing component and the plug component are connected through the second connection status, the processor is configured to control the first switch to disable the path between the first laser and the processor, and the processor is further configured to control the second switch to enable the path between the second laser and the processor. The second laser as the target laser is configured to emit the to-be-split optical signal having the second wavelength. The first wavelength and the second wavelength are different from each other.

The optical module uses a plurality of non-tunable wavelength lasers, which can effectively reduce costs of the optical module.

Based on the first aspect, in an optional implementation, each primary port and each secondary port are optical fiber adapters. The optical module further includes a plurality of optical fiber connecting pieces. Each optical fiber connecting piece includes an optical fiber. Two ends of the optical fiber are respectively connected to a first optical fiber connector and a second optical fiber connector. The first optical fiber connector is configured to be inserted into one of the plurality of primary ports. The second optical fiber connector is configured to be inserted into one of the plurality of secondary ports.

Based on the first aspect, in an optional implementation, each primary port is an optical fiber adapter. Each secondary port is an optical fiber connector. One of the plurality of secondary ports is inserted into one of the plurality of primary ports.

Based on the first aspect, in an optional implementation, the optical module and the peer optical module are connected through a first duplex optical fiber and a second duplex optical fiber. The first duplex optical fiber is configured to transmit the first service optical signal and the second service optical signal. The second duplex optical fiber is configured to transmit the first local oscillator optical signal and the second local oscillator optical signal.

Based on the first aspect, in an optional implementation, the coherent detection is a self-homodyne detection SHD detection.

The processor performs phase noise cancellation by using the second local oscillator optical signal. To be specific, phase noises of the second local oscillator optical signal and the second service optical signal cancel each other. The SHD performed by the processor 204 on the second service optical signal and the second local oscillator optical signal can effectively improve accuracy of the processor to obtain a service signal carried by the second service optical signal.

According to a second aspect, an embodiment provides a processing component. The processing component includes a target laser, an optical splitter, a modulator, and a processor that are sequentially connected. The processing component includes a plurality of primary ports. The modulator is connected to one of the plurality of primary ports. The optical splitter is connected to one of the plurality of primary ports. The processor is connected to two primary ports in the plurality of primary ports. The primary port connected to the modulator, the primary port connected to the optical splitter, and the primary port connected to the processor are different from each other. The target laser is configured to send a to-be-split optical signal to the optical splitter. The optical splitter is configured to split the to-be-split optical signal to obtain the first local oscillator optical signal and a to-be-modulated optical signal. The optical splitter is further configured to send the first local oscillator optical signal to the primary port connected to the optical splitter. The modulator is configured to modulate a service signal on the to-be-modulated optical signal to obtain the first service optical signal. The modulator is further configured to send the first service optical signal to the primary port connected to the modulator. The processor is configured to separately receive a second service optical signal and a second local oscillator optical signal through the two primary ports connected to the processor, and the processor is configured to perform coherent detection on the second service optical signal based on the second local oscillator optical signal.

For descriptions of beneficial effects of using the processing component shown in this aspect, refer to the first aspect. Details are not described again.

Based on the second aspect, in an optional implementation, the plurality of primary ports include a first primary port, a second primary port, a third primary port, and a fourth primary port. The modulator is connected to the first primary port. The optical splitter is connected to the third primary port. The processor is connected to the second primary port and the fourth primary port. The first primary port and the second primary port are connected through a first optical fiber. The third primary port and the fourth primary port are connected through a second optical fiber. The processor is configured to receive the first service optical signal from the first primary port through the second primary port. The processor is configured to receive the first local oscillator optical signal from the third primary port through the fourth primary port. The processor is configured to perform the coherent detection on the first service optical signal based on the first local oscillator optical signal.

The processor implements self-loop detection by performing the coherent detection on the first service optical signal based on the first local oscillator optical signal. If the processor can normally receive the first service optical signal and the first local oscillator optical signal, the processing component can normally send an optical signal. The processor can further determine, based on the coherent detection on the first service optical signal and the first local oscillator optical signal, whether signal strength, a phase, polarization, and a frequency of the first service optical signal and the first local oscillator optical signal that are sent by the processing component are normal.

Based on the second aspect, in an optional implementation, the processing component includes a first laser and a second laser that are separately connected to the optical splitter. A first switch is connected between the first laser and the processor. A second switch is connected between the second laser and the processor. The processor is configured to control the first switch to enable a path between the first laser and the processor, and the processor is further configured to control the second switch to disable the path between the second laser and the processor. The first laser as the target laser is configured to emit the to-be-split optical signal having a first wavelength. The processor is configured to control the first switch to disable the path between the first laser and the processor. The processor is further configured to control the second switch to enable the path between the second laser and the processor. The second laser as the target laser is configured to emit the to-be-split optical signal having a second wavelength. The first wavelength and the second wavelength are different from each other.

According to a third aspect, an embodiment provides a plug component. The plug component includes a plurality of filters. The plurality of filters are connected to a plurality of secondary ports, and the plurality of secondary ports are configured to be connected to a plurality of primary ports of a processing component. The plurality of primary ports and the plurality of secondary ports are connected through a first connection status or a second connection status. The first connection status and the second connection status are different statuses of connections between the plurality of primary ports and the plurality of secondary ports, and a same primary port is connected to different secondary ports in the first connection status or in the second connection status. The plurality of filters are configured to send a first service optical signal and a first local oscillator optical signal from the processing component to a peer optical module, and the plurality of filters are further configured to send a second service optical signal and a second local oscillator optical signal from the peer optical module to the processing component. In different connection statuses, a wavelength of the first service optical signal sent by the plurality of filters varies. In different connection statuses, a wavelength of the first local oscillator optical signal sent by the plurality of filters various. In a same connection status, wavelengths of the first service optical signal and the first local oscillator optical signal that are sent by the plurality of filters are identical.

In different connection statuses, a wavelength of the second service optical signal sent by the plurality of filters varies. In different connection statuses, a wavelength of the second local oscillator optical signal sent by the plurality of filters varies. In a same connection status, wavelengths of the second service optical signal and the second local oscillator optical signal that are sent by the plurality of filters are identical.

For descriptions of beneficial effects of the plug component shown in this aspect, refer to the first aspect. Details are not described again.

Based on the third aspect, in an optional implementation, the plurality of primary ports include a first primary port, a second primary port, a third primary port, and a fourth primary port. The plurality of secondary ports include a first secondary port, a second secondary port, a third secondary port, and a fourth secondary port. The first connection status is that the first primary port is connected to the first secondary port, the second primary port is connected to the second secondary port, the third primary port is connected to the third secondary port, and the fourth primary port is connected to the fourth secondary port. The second connection status is that the first primary port is connected to the fourth secondary port, the second primary port is connected to the third secondary port, the third primary port is connected to the second secondary port, and the fourth primary port is connected to the first secondary port.

Based on the third aspect, in an optional implementation, the plug component includes a first filter and a second filter. The first filter is connected to the first secondary port and the second secondary port. The second filter is connected to the third secondary port and the fourth secondary port. The first filter is further connected to a first transmission port. The second filter is further connected to a second transmission port. The first transmission port and the second transmission port are separately connected to the peer optical module through an optical fiber.

Based on the third aspect, in an optional implementation, the first filter is configured to receive, through the first secondary port, a first optical signal having a first wavelength from the first primary port. The first filter is configured to send the first optical signal to the first transmission port. The first transmission port is configured to send the first optical signal to the peer optical module. The second filter is configured to receive, through the third secondary port, a second optical signal having the first wavelength from the third primary port. The second filter is further configured to send the second optical signal to the second transmission port. The second transmission port is configured to send the second optical signal to the peer optical module. In the first optical signal and the second optical signal, one channel of optical signals is the first service optical signal, and another channel of the optical signals is the first local oscillator optical signal.

Based on the third aspect, in an optional implementation, the second filter is configured to receive, through the fourth secondary port, a third optical signal having a second wavelength from the first primary port. The second filter is configured to send the third optical signal to the second transmission port. The second transmission port is configured to send the third optical signal to the peer optical module. The first filter is configured to receive, through the second secondary port, a fourth optical signal having the second wavelength from the third primary port. The first filter is further configured to send the fourth optical signal to the first transmission port. The first transmission port is configured to send the fourth optical signal to the peer optical module. In the third optical signal and the fourth optical signal, one channel of optical signals is the first service optical signal, and another channel of the optical signals is the first local oscillator optical signal.

Based on the third aspect, in an optional implementation, the first filter is configured to receive, through the first transmission port, a fifth optical signal having a second wavelength from the peer optical module. The first filter is configured to send the fifth optical signal to the second secondary port. The processing component is configured to receive the fifth optical signal from the second secondary port through the second primary port. The second filter is configured to receive, through the second transmission port, a sixth optical signal having the second wavelength from the peer optical module. The second filter is configured to send the sixth optical signal to the fourth secondary port. The processing component is configured to receive the sixth optical signal from the fourth secondary port through the fourth primary port. In the fifth optical signal and the sixth optical signal, one channel of optical signals is the second service optical signal, and another channel of the optical signals is the second local oscillator optical signal.

Based on the third aspect, in an optional implementation, the second filter is configured to receive, through the second transmission port, a seventh optical signal having a first wavelength from the peer optical module. The second filter is configured to send the seventh optical signal to the third secondary port. The processing component is configured to receive the seventh optical signal from the third secondary port through the second primary port. The first filter is configured to receive, through the first transmission port, an eighth optical signal having the first wavelength from the peer optical module. The first filter is configured to send the eighth optical signal to the first secondary port. The processing component is configured to receive the eighth optical signal from the first secondary port, through the fourth primary port. In the seventh optical signal and the eighth optical signal, one channel of optical signals is the second service optical signal, and another channel of the optical signals is the second local oscillator optical signal.

Based on the third aspect, in an optional implementation, each primary port and each secondary port are optical fiber adapters. The optical module further includes a plurality of optical fiber connecting pieces. Each optical fiber connecting piece includes an optical fiber. Two ends of the optical fiber are respectively connected to a first optical fiber connector and a second optical fiber connector. The first optical fiber connector is configured to be inserted into one of the plurality of primary ports. The second optical fiber connector is configured to be inserted into one of the plurality of secondary ports.

Based on the third aspect, in an optional implementation, each primary port is an optical fiber adapter. Each secondary port is an optical fiber connector. One of the plurality of secondary ports is inserted into one of the plurality of primary ports.

Based on the third aspect, in an optional implementation, the first transmission port and the second transmission port are connected to the peer optical module through a first duplex optical fiber and a second duplex optical fiber. The first duplex optical fiber is configured to transmit the first service optical signal and the second service optical signal. The second duplex optical fiber is configured to transmit the first local oscillator optical signal and the second local oscillator optical signal.

According to a fourth aspect, an embodiment provides an optical signal transmission method. The method is applied to an optical module. The optical module includes a processing component and a plug component. The plug component includes a plurality of filters. The plurality of filters are connected to a plurality of secondary ports. The processing component includes a plurality of primary ports. The optical module is in a first connection status or a second connection status. The first connection status and the second connection status are different statuses of connections between the plurality of primary ports and the plurality of secondary ports. A same primary port is connected to different secondary ports in the first connection status or in the second connection status The method includes: sending a first service optical signal and a first local oscillator optical signal from the processing component to a peer optical module through the plurality of filters; sending a second service optical signal and a second local oscillator optical signal from the peer optical module to the processing component through the plurality of filters; performing, by the processing component, coherent detection on the second service optical signal based on the second local oscillator optical signal; when the optical module is in different connection statuses, a wavelengths of the first service optical signal sent by the plurality of filters varies, when the optical module is in different connection statuses, a wavelength of the first local oscillator optical signal sent by the plurality of filters varies, and when the optical module is in a same connection status, wavelengths of the first service optical signal and the first local oscillator optical signal that are sent by the plurality of filters are identical; and when the optical module is in different connection statuses, a wavelength of the second service optical signal sent by the plurality of filters varies, when the optical module is in different connection statuses, a wavelength of the second local oscillator optical signal sent by the plurality of filters varies, and when the optical module is in a same connection status, wavelengths of the second service optical signal and the second local oscillator optical signal that are sent by the plurality of filters are identical.

According to a fifth aspect, an embodiment provides a self-loop detection method. The method is applied to an optical module. For a description of a specific structure of the optical module, refer to the foregoing first aspect. The self-loop detection method includes: A processing component output a first service optical signal through a first primary port. The processing component receives the first service optical signal from the first primary port through a second primary port. The processing component receives the first service optical signal through a processor. The process-ing component outputs a first local oscillator optical signal through a third primary port. The processing component receives the first local oscillator optical signal from the third primary port through a fourth primary port. The processing component receives the first local oscillator optical signal through the processor. The processing component performs coherent detection on a second local oscillator optical signal and a second service optical signal through the processor.

According to the self-loop detection shown in this aspect, if the processor can normally receive the first service optical signal and the first local oscillator optical signal, the processing component can normally send an optical signal. The processor can further determine, based on the coherent detection on the first service optical signal and the first local oscillator optical signal, whether signal strength, a phase, polarization, and a frequency of the first service optical signal and the first local oscillator optical signal that are sent by the processing component are normal.

According to a sixth aspect, an embodiment provides a coherent optical transmission system, including an optical module and a peer optical module, where the optical module is shown in any one of the foregoing first aspect.

BRIEF DESCRIPTION OF DRAWINGS

FIG. 4 is an example diagram of a connection status switching scenario of an optical module according to this disclosure;

FIG. 4a is an example diagram of a connection status switching scenario of an optical module according to this disclosure;

FIG. 4b is an example diagram of another connection status switching scenario of an optical module according to this disclosure;

DESCRIPTION OF EMBODIMENTS

The following clearly and completely describes the technical solutions of disclosed embodiments, which are merely illustrative of some but not all embodiments. All other embodiments obtained by persons skilled in the art based on embodiments of the present disclosure without creative efforts shall fall within the protection scope of the accompanying claims.

The following describes a coherent transmission system that includes an optical module in accordance with the subject novel disclosure.

The coherent optical transmission system shown in this disclosure may be a data center network (DCN) or a data center optical interconnection (DCI) network.

The coherent optical transmission system shown in this embodiment uses a coherent optical transmission technology to implement exchange of optical signals between different optical modules. The optical modules shown in this embodiment may be two switches that are located at different positions and can implement bi-direction communication. The coherent optical transmission technology enables the coherent optical transmission system to have advantages such as large bandwidth, long transmission distance, and strong flexibility, to ensure that the coherent optical transmission system can be widely used in metropolitan area, backbone, and ocean optical communication networks.

Figure 1:
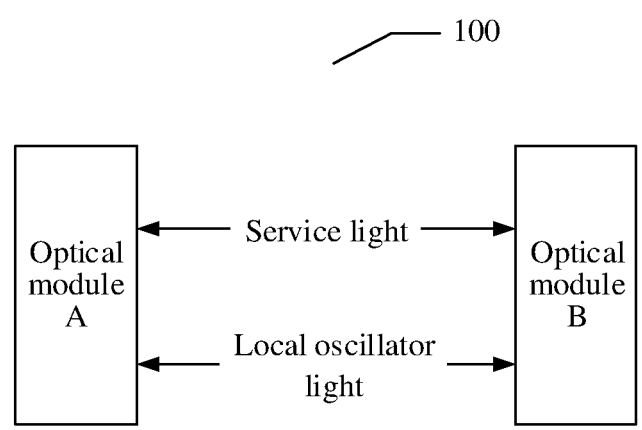
FIG. 1 is a schematic diagram of a structure of a coherent optical transmission system according to conventional technologies.
Figure 2:
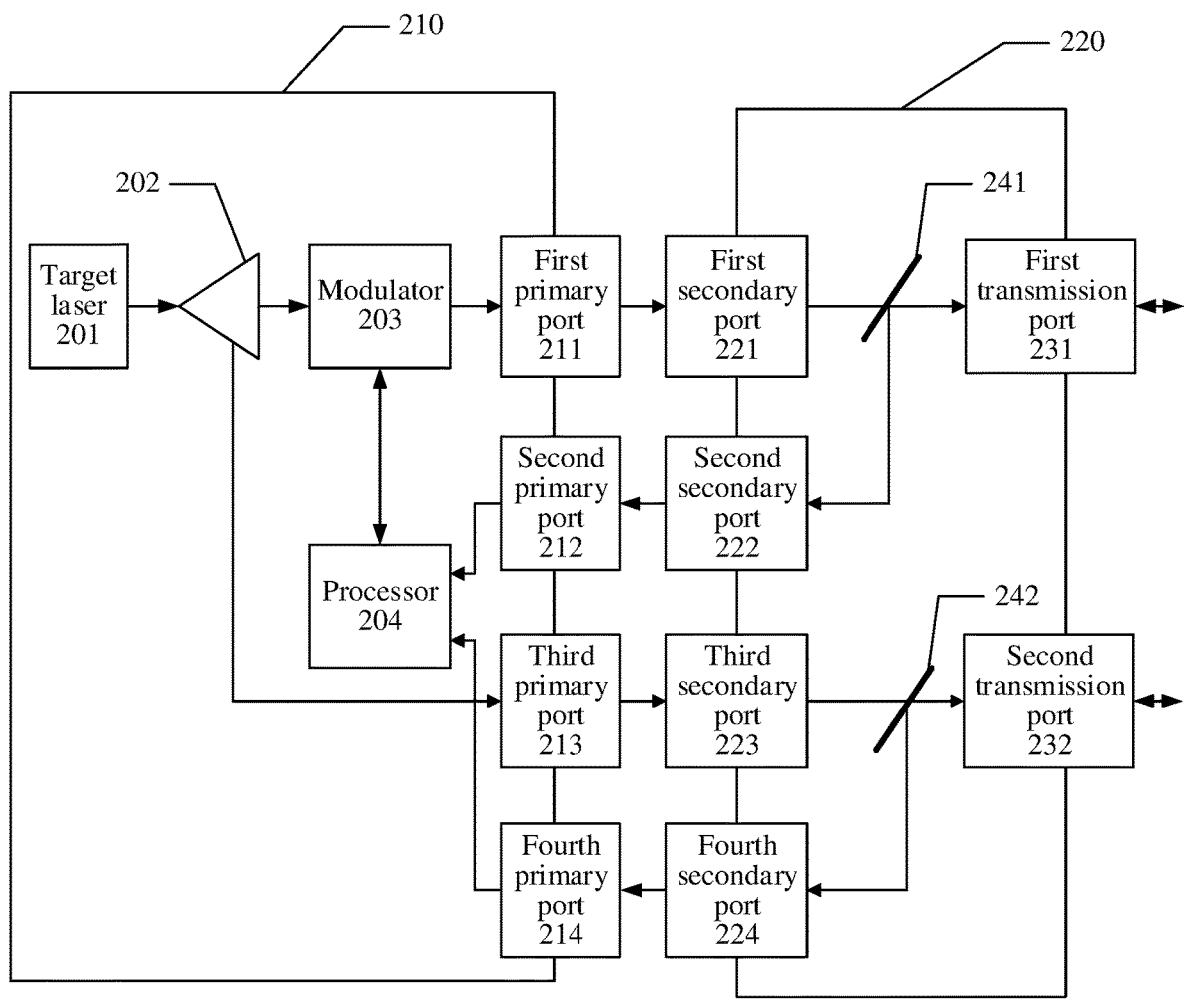
FIG. 2 is a schematic diagram of a structure of a first embodiment of an optical module according to this disclosure.

The following describes a structure of an optical module provided in this application with reference to FIG. 2.

The optical module shown in this embodiment includes a processing component 210 and a plug component 220 connected to the processing component 210.

The structure of the processing component 210 is described as follows:

The processing component 210 shown in this embodiment is configured to send a first service optical signal and a first local oscillator optical signal that are to be sent to a peer optical module to the plug component 220. The plug component 220 sends the first service optical signal and the first local oscillator optical signal to the peer optical module.

The following describes a specific process of sending the first service optical signal and the first local oscillator optical signal with reference to a specific structure of the processing component 210.

The processing component 210 shown in this embodiment includes a target laser 201 and an optical splitter 202 connected to the target laser 201. The optical splitter 202 is further connected to a modulator 203.

The processing component 210 includes a plurality of primary ports. In this embodiment, an example in which the processing component 210 includes four primary ports is used for an example for description, that is, a first primary port 211, a second primary port 212, a third primary port 213, and a fourth primary port 214. The modulator 203 is connected to the first primary port 211. The second primary port and the fourth primary port 214 are both connected to a processor 204. The third primary port 213 is connected to the optical splitter 202.

It should be noted that a quantity of primary ports included in the processing component 210 is not limited in this embodiment, provided that different primary ports implement transmission of different optical signals.

The target laser 201 shown in this embodiment is configured to send a to-be-split optical signal to the optical splitter 202. A wavelength of the to-be-split optical signal is not limited in this embodiment, that is, a wavelength of the to-be-split optical signal sent by the target laser 201 may be any wavelength in any band, such as a C band, an L band, an O band, or the like.

The target laser 201 shown in this embodiment is a wavelength-tunable laser, where the wavelength-tunable laser means that a wavelength of an optical signal emitted by the laser may be changed according to a requirement. For example, in the optical module shown in FIG. 2, a wavelength of the to-be-split optical signal sent by the target laser 201 is a first wavelength $\lambda 1$. In the optical module shown in FIG. 3, the wavelength of the to-be-split optical signal sent by the target laser 201 may be a second wavelength $\lambda 2$, and a value of the first wavelength $\lambda 1$ is different from a value of the second wavelength $\lambda 2$. As shown in FIG. 2, an example in which the wavelength of the to-be-split optical signal is the first wavelength $\lambda 1$ is used for description.

A specific type of the target laser is not limited in this embodiment. For example, the target laser may be an uncooled distributed laser such as a distributed feedback (DFB) laser.

The target laser 201 sends the to-be-split optical signal to the optical splitter 202. The optical splitter 202 is configured to split the to-be-split optical signal to obtain the first local oscillator optical signal and a to-be-modulated optical signal. A split ratio of the optical splitter 202 is not limited in this embodiment. In this embodiment, an example in which the optical ratio of the optical splitter 202 is 50%:50% is used as an example for description. That is, the optical splitter split the to-be-split optical signal into the first local oscillator optical signal and the to-be-modulated optical signal, where optical power of the first local oscillator optical signal is 50% of optical power of the to-be-split optical signal, and the optical power of the to-be-modulated optical signal is 50% of the optical power of the to-be-split optical signal.

The optical splitter 202 is further configured to send the first local oscillator optical signal to the third primary port 213, and send the to-be-modulated optical signal to the modulator 203. The modulator 203 is configured to modulate a service signal on the to-be-modulated optical signal to obtain the first service optical signal. The modulator 203 is configured to send the first service optical signal to the first primary port 211.

The first primary port 211 can receive the first service optical signal from the modulator 203, and the third primary port 213 can receive the first local oscillator optical signal from the optical splitter 202.

The processing component 210 shown in this embodiment is further configured to receive a second service optical signal and a second local oscillator optical signal from the peer optical module through the plug component 220. The following describes a process of receiving the second service optical signal and the second local oscillator optical signal with reference to a specific structure of the processing component 210.

The second primary port 212 shown in this embodiment is configured to receive the second service optical signal from the plug component 220. The fourth primary port is configured to receive the second local oscillator optical signal from the plug component 220. The second primary port 212 is configured to send the second service optical signal to the processor 204. The fourth primary port 214 is configured to send the second local oscillator optical signal to the processor 204.

When receiving the second service optical signal and the second local oscillator optical signal, the processor 204 may perform coherent detection on the second optical signal through the second local oscillator optical signal. Tolerance to a multipath interference (MPI) effect is improved through the coherent detection. In addition, sensitivity of the optical module is improved. In this embodiment, an example in which the coherent detection is self-homodyne detection (SHD) is used for example for description.

SHD refers to: The processor 204 receives the second service optical signal and the second local oscillator optical signal that have a same wavelength. When an optical path difference between the second local oscillator optical signal and the second service optical signal is small enough, the processor 204 performs phase noise cancellation through the second local oscillator optical signal. Even if phase noises of the second local oscillator optical signal and the second service optical signal cancel each other. It can be learned that the SHD performed by the processor 204 on the second service optical signal and the second local oscillator optical signal can effectively improve accuracy of the processor 204 to obtain a service signal carried by the second service optical signal.

A specific type of the processor 204 is not limited in this embodiment. For example, the processor 204 may be one or more chips or one or more integrated circuits. This is not specifically limited in this embodiment. as long as the processor 204 can perform the coherent detection on the second service optical signal through the second local oscillator optical signal. For example, the processor 204 may be one or more field-programmable gate arrays (FPGAs), application specific integrated circuits (ASICs), system on chips (SoCs), central processor units (CPUs), network processors (NPs), digital signal processors (DSPs), micro controller units (MCUs), programmable logic devices (PLDs), or other integrated chips, or any combination of the foregoing chips or processors.

Wavelengths of service optical signals and local oscillator optical signals sent by an existing optical module are fixed. For example, the optical module can send only the service optical signals and the local oscillator optical signals having the first wavelength $\lambda 1$. If the optical module needs to be sent the service optical signals and the local oscillator optical signals that are different from the first wavelength $\lambda 1$, the optical module needs to be replaced. For another example, wavelengths of the service optical signals and the local oscillator optical signals received by an existing optical module are fixed. For example, the optical module can receive only the service optical signals and the local oscillator optical signals that have the second wavelength $\lambda 2$. If the optical module needs to receive the service optical signals and the local oscillator optical signals that are different from the second wavelength $\lambda 2$, the optical module needs to be replaced. In addition, the existing optical module is produced, and different optical modules need to be produced based on different wavelengths of sent and received optical signals.

However, the optical module shown in this embodiment can send the service optical signals and the local oscillator optical signals with different wavelengths based on networking requirements, and can also receive the service optical signals and the local oscillator optical signals with different wavelengths based on the networking requirements, so as to produce an optical module. The optical module may receive and receive optical signals having different wavelengths based on the different networking requirements. The following describes how the optical module shown in this embodiment changes wavelengths of transmitted the service optical signals and the local oscillator optical signals based on the networking requirements.

The optical module shown in this embodiment may change wavelengths of the first service optical signal and the first local oscillator optical signal that are sent by the optical module based on different statuses of connections between the processing component 210 and the plug component 220, and may also change wavelengths of the second service optical signal and the second local oscillator optical signal that are received by the optical module based on different statuses of connections between the processing component 210 and the plug component 220.

Different statuses of connections between the processing component 210 and the plug component 220 are first described below.

The different statuses of connections between the processing component 210 and the plug component 220 in this embodiment refer to different connection manners between the plurality of primary ports included in the processing component 210 and a plurality of secondary ports included in the plug component 220. The plug component 220 shown in this embodiment includes four secondary ports, that is, a first secondary port 221, a second secondary port 222, a third secondary port 223, and a fourth secondary port 224. It should be noted that the description of a quantity of secondary ports included in the plug component 220 in this embodiment is an optional example, and is not limited.

Figure 3:
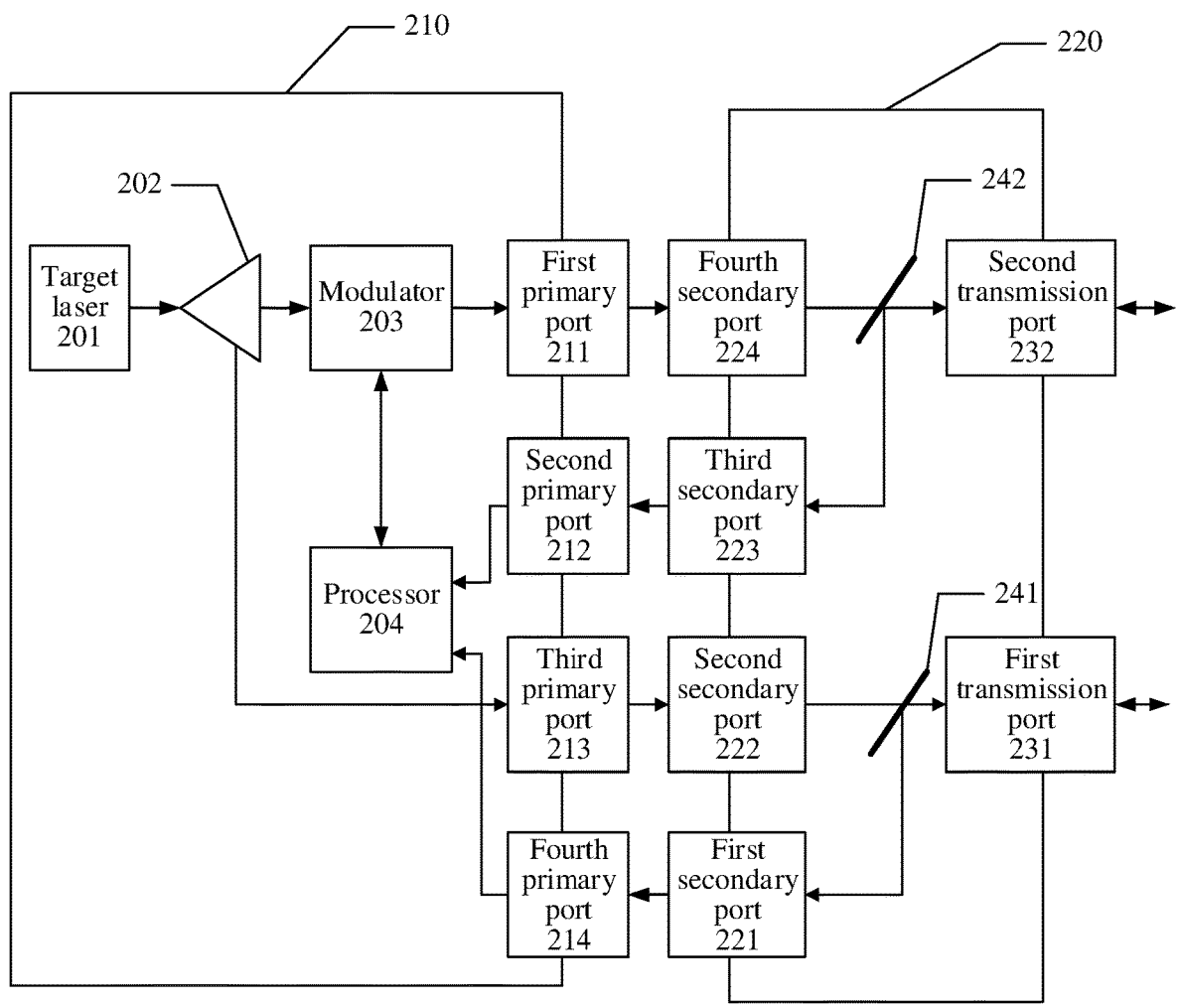
FIG. 3 is a schematic diagram of a structure of a second embodiment of an optical module according to this disclosure.

With reference to FIG. 2 and FIG. 3, FIG. 2 is a schematic diagram of a structure of a connection between the processing component 210 and the plug component 220 in a first connection status, and FIG. 3 is a schematic diagram of a structure of a connection between the processing component 210 and the plug component 220 in a second connection status.

The first connection status shown in FIG. 2 is that the first primary port 211 is connected to the first secondary port 221, the second primary port 212 is connected to the second secondary port 222, the third primary port 213 is connected to the third secondary port 223, and the fourth primary port 214 is connected to the fourth secondary port 224.

When the optical module is in the first connection status shown in FIG. 2, the optical module can send the first service optical signal and the first local oscillator optical signal that have the first wavelength $\lambda 1$, and the optical module can receive the second service optical signal and the second local oscillator optical signal that have the second wavelength $\lambda 2$. A value of the first wavelength $\lambda 1$ is different from a value of the second wavelength $\lambda 2$.

The second connection status shown in FIG. 3 is that the first primary port 211 is connected to the fourth secondary port 224, the second primary port 212 is connected to the third secondary port 223, the third primary port 213 is connected to the second secondary port 222, and the fourth primary port 214 is connected to the first secondary port 221.

When the optical module is in the second connection status shown in FIG. 3, the optical module can send the first service optical signal and the first local oscillator optical signal that have the second wavelength $\lambda 2$, and the optical module can receive the second service optical signal and the second local oscillator optical signal that have the first wavelength $\lambda 1$.

It should be noted that, in this embodiment, descriptions of wavelengths of optical signals sent and received by the optical module when the optical module is in the first connection status and is in the second connection status are optional examples, and are not limited, provided that the optical module is in different connection statuses, wavelengths of the received optical signals vary, and wavelengths of the sent optical signals vary when the optical module is in different connection statuses.

Different connection statuses of the processing component 210 and the plug component 220 in this embodiment refer to different statuses of connections between the four primary ports and the four secondary ports. In this embodiment, descriptions of different statuses of connections between the four primary ports and the four secondary ports are optional examples, and are not limited. Provided that a same primary port is connected to different secondary ports in the first connection status and the second connection status. For example, the same first primary port 211 is connected to the first secondary port 221 in the first connection manner shown in FIG. 2, and the first primary port 211 is connected to the fourth secondary port 224 in the second connection manner shown in FIG. 3.

The following describes several optional connection manners between each primary port and each secondary port.
Manner One:

The processing component 210 and the plug component 220 shown in this manner are connected through an optical fiber connecting piece.

Each primary port and each secondary port shown in this manner are optical fiber adapters, and a specific type of optical fiber adapter is not limited in this manner. For example, the optical fiber adapter may be any one of the following types:

a ferrule connector (FC) type optical fiber connector, a subscriber connector (SC) type optical fiber connector, a lucent connector (LC) type optical fiber connector, a straight tip (ST) type optical fiber connector or fiber distributed data interface (FDDI) type optical fiber connector or the like.

The optical module in this manner further includes four optical fiber connecting pieces, that is, a first optical fiber connecting piece, a second optical fiber connecting piece, a third optical fiber connecting piece, and a fourth optical fiber connecting piece. Using the first optical fiber connecting piecer as an example, the first optical fiber connecting piece includes an optical fiber, and two ends of the optical fiber are respectively connected to a first optical fiber connector and a second optical fiber connector.

When the optical module shown in FIG. 2 is in the first connection status, the first optical fiber connector of the first optical fiber connecting piece is inserted into the first primary port 211, a second optical fiber connector of the first optical fiber connecting piece is inserted into the first secondary port 221, and so on. The first optical fiber connector of the fourth optical fiber connecting piece is inserted into the fourth primary port 214, and the second optical fiber connector of the fourth optical fiber connecting piece is inserted into the fourth secondary port 224.

When the optical module shown in FIG. 3 is in the second connection status, the first optical fiber connector of the first optical fiber connecting piece is inserted into the first primary port 211, the second optical fiber connector of the first optical fiber connecting piece is inserted into the fourth secondary port 224, and so on. The first optical fiber connector of the fourth optical fiber connecting piece is inserted into the fourth primary port 214, and the second optical fiber connector of the fourth optical fiber connecting piece is inserted into the first secondary port 221.

In this manner, two optical fiber connectors of each optical fiber connecting piece may be inserted into different primary ports and different secondary ports, so as to implement switching of different connection statuses of the optical module.
Manner Two:

A difference between this manner and manner one lies in that the processing component 210 and the plug component 220 shown in this manner do not need to be connected through an optical fiber connecting piece, that is, the primary port included in the processing component 210 and the secondary port included in the plug component 220 shown in this manner are directly plugged and connected.

Each primary port shown in this manner is an optical fiber adapter. For specific descriptions of the optical fiber adapter, refer to the manner one, and details are not described in this embodiment. Each secondary port shown in this manner is an optical fiber connector.

When the optical module shown in FIG. 2 is in the first connection status, the first secondary port 221 is inserted into the first primary port 211, and so on, the fourth secondary port 224 is inserted into the fourth primary port 214.

When the optical module shown in FIG. 3 is in the second connection status, the fourth secondary port 224 is inserted into the first primary port 211, and so on, the first secondary port 221 is inserted into the fourth primary port 214.

In this manner, that each primary port is the optical fiber adapter and each secondary port is the optical fiber connector is used as an example. In another example, each primary port may also be the optical fiber connector, and each secondary port is the optical fiber adapter.

In a specific application process of the optical module shown in this embodiment, if the optical module needs to send the first service optical signal and the first local oscillator optical signal that have the first wavelength $\lambda 1$, and the optical module needs to receive the second service optical signal and the second local oscillator optical signal that have the second wavelength $\lambda 2$, a position of the plug component 220 may be adjusted as shown in FIG. 4a in FIG. 4. In this way, the first primary port 211 and the first secondary port 221 are aligned, and so on, and the fourth primary port 214 and the fourth secondary port 224 are aligned, so that the processing component 210 and the plug component 220 are connected in manner one or manner two shown above.

When the wavelength of the optical signal sent and received by the optical module needs to be adjusted, the plug component 220 may be rotated in a direction shown by an arrow 402 shown in FIG. 4a, so that the plug component 220 is rotated to a position shown in FIG. 4b in FIG. 4. That is, it is ensured that the first primary port 211 and the fourth secondary port 224 are aligned, and so on, and the fourth primary port 214 and the first secondary port 221 are aligned, so that the processing component 210 and the plug component 220 are connected in the foregoing manner one or manner two.

The following describes a specific structure of the plug component 220.

As shown in FIG. 2 and FIG. 3, the plug component 220 in this embodiment includes a first filter 241 connected to the first secondary port 221 and the second secondary port 222. The plug component 220 further includes a second filter 242 connected to the third secondary port 223 and the fourth secondary port 224.

The first filter and the second filter shown in this embodiment may be coarse wavelength division multiplexer (CWDM). For another example, the first filter and the second filter may be filter sheets. For another example, the first filter and the second filter may be thin-film filters (TFFs). This is not specifically limited in this embodiment, provided that the first filter and the second filter can perform filtering based on the wavelength of the optical signal. The following describes functions of the first filter 241 and the second filter 242 in this embodiment.

Through the plug component 220 including a plurality of filters shown in this embodiment, when the optical module is in the first connection status, wavelengths of the first service optical signal and the first local oscillator optical signal that are sent by the plurality of filters included in the plug component 220 to the peer optical module are as follows: When the optical module is in the second connection status, wavelengths of the first service optical signal and the first local oscillator optical signal that are sent by the plurality of filters included in the plug component 220 to the peer optical module are different from each other.

However, when the optical module is in a same connection status, wavelengths of the first service optical signal and the first local oscillator optical signal that are sent by the plurality of filters included in the plug component 220 to the peer optical module are the same. For example, when the optical module is in the first connection status, the first service optical signal sent by the plurality of filters included in the plug component 220 to the peer optical module has the same wavelength as the first local oscillator optical signal. For another example, when the optical module is in the second connection status, wavelengths of the first service optical signal and the second local oscillator optical signal that are sent by the plurality of filters included in the plug component 220 to the peer optical module are identical.

In addition, by using the plug component 220 including the plurality of filters shown in this embodiment, it can enable that wavelengths of the second service optical signal and the second local oscillator optical signal that are sent by the plurality of filters included in the plug component to the processing component 210 when the optical module is in the first connection status to be different from that values of the second service optical signal and the second local oscillator optical signal that are sent by the plurality of filters included in the plug component 220 to the processing component 210 when the optical module is in the second connection status.

However, when the optical module is in a same connection status, wavelengths of the second service optical signal and the second local oscillator optical signal that are sent by the plurality of filters included in the plug component 220 to the processing component 210 are identical. For example, when the optical module is in the first connection status, the second service optical signal sent by the plurality of filters included in the plug component 220 to the processing component 210 has the same wavelength as the second local oscillator optical signal. For another example, when the optical module is in the second connection status, wavelengths of the second service optical signal and the second local oscillator optical signal that are sent by the plurality of filters included in the plug component 220 to the processing component 210 are identical.

For better understanding, the following specifically describes the sending and receiving of the optical signal when the optical module is in different connection statuses.

When the optical module is in the first connection status shown in FIG. 2, and the optical module is used as a transmit end of the optical signal, the target laser 201 is configured to send a to-be-split optical signal having the first wavelength $\lambda 1$. For specific descriptions of the to-be-split optical signal, refer to the foregoing description. Details are not described in this embodiment.

The first filter 241 is configured to receive, through the first secondary port 221, a first optical signal having the first wavelength $\lambda 1$ from the first primary port 211. The first filter 241 is configured to allow the first optical signal having the first wavelength $\lambda 1$ to pass through the first filter 241. Specifically, the first optical signal having the first wavelength $\lambda 1$ is transmitted by the first filter 241, and is transmitted to the first transmission port 231 connected to the first filter 241. The first transmission port 231 is configured to send the first optical signal to the peer optical module.

The second filter 242 is configured to receive, through the third secondary port 223, a second optical signal having the first wavelength $\lambda 1$ from the third primary port 213. The second filter 242 is configured to allow the second optical signal having the first wavelength $\lambda 1$ to pass through the second filter 242. The second optical signal having the first wavelength $\lambda 1$ is transmitted by the second filter 242, and is transmitted to the second transmission port 232 connected to the second filter 242. The second transmission port 232 is configured to send the second optical signal to the peer optical module.

In this embodiment, when the first primary port 211 is connected to the modulator 203, and the third primary port 213 is connected to the optical splitter 202, the first optical signal is a first service optical signal having a first wavelength $\lambda 1$, and the second optical signal is a first local oscillator optical signal having the first wavelength $\lambda 1$.

In another example, if the third primary port 213 is connected to the modulator 203, and the first primary port 211 is connected to the optical splitter 202, the first optical signal is a first local oscillator optical signal having a first wavelength $\lambda 1$, and the second optical signal is a first service optical signal having a first wavelength $\lambda 1$.

When the optical module is in the first connection status shown in FIG. 2, and the optical module is used as a receive end of the optical signal, the first filter 241 is configured to receive, through the first transmission port 231, a fifth optical signal having the second wavelength $\lambda 2$ from the peer optical module. The first filter 241 is configured to allow the fifth optical signal having the second wavelength $\lambda 2$ to pass through the first filter 241. Specifically, the fifth optical signal having the second wavelength $\lambda 2$ is reflected by the first filter 241, and is transmitted to the second secondary port 222. The second secondary port 222 is configured to transmit the fifth optical signal to the second primary port 212. The second primary port 212 is configured to transmit the fifth optical signal to the processor 204.

The first filter 241 shown in this embodiment transmits the first optical signal having the first wavelength $\lambda 1$ and reflects the fifth optical signal having the second wavelength $\lambda 2$ to filter the first optical signal and the fifth optical signal.

The second filter 242 is configured to receive, through the second transmission port 232, a sixth optical signal having the second wavelength $\lambda 2$ from the peer optical module. The second filter 242 is configured to allow the sixth optical signal having the second wavelength $\lambda 2$ to pass through the second filter 242. Specifically, the sixth optical signal having the second wavelength $\lambda 2$ is reflected by the second filter 242, and is transmitted to a fourth secondary port 224. The fourth secondary port 224 is configured to transmit the sixth optical signal to the fourth primary port 214. The fourth primary port 214 is configured to transmit the sixth optical signal to the processor 204.

The second filter 242 shown in this embodiment transmits the second optical signal having the first wavelength $\lambda 1$ and reflects the sixth optical signal having the second wavelength $\lambda 2$, to filter the second optical signal and the sixth optical signal.

In this embodiment, in the fifth optical signal and the sixth optical signal that have the second wavelength $\lambda 2$, one channel of optical signals is the second service optical signal, and another channel of the optical signals is the second local oscillator optical signal. For example, the fifth optical signal is the second service optical signal, and the sixth optical signal is the second local oscillator optical signal. For another example, the fifth optical signal is the second local oscillator optical signal, and the sixth optical signal is the second service optical signal.

When the processor 204 receives the second service optical signal and the second local oscillator optical signal through the second primary port 212 and the fourth primary port 214, the processor 204 may perform coherent detection on the second service optical signal based on the second local oscillator optical signal. For specific descriptions of the coherent detection, refer to the foregoing description. Details are not described in this embodiment.

When the optical module is in the second connection status shown in FIG. 3, and the optical module is used as the transmit end of the optical signal, the target laser 201 is configured to send the to-be-split optical signal having the second wavelength λ2.

The second filter 242 is configured to receive, through the fourth secondary port 224, a third optical signal having the second wavelength λ2 from the first primary port 211. The second filter 242 is configured to allow the third optical signal having the second wavelength λ2 to pass through the second filter 242. Specifically, the third optical signal having the second wavelength λ2 is transmitted by the second filter 242, and is transmitted to the second transmission port 232. The second transmission port 232 is configured to send the third optical signal to the peer optical module.

The first filter 241 is configured to receive, through the second secondary port 222, a fourth optical signal having the second wavelength λ2 from the third primary port 213. The first filter 241 is configured to allow the fourth optical signal having the second wavelength λ2 to pass through the first filter 241. Specifically, the fourth optical signal having the second wavelength λ2 is transmitted by the first filter 241, and is transmitted to the first transmission port 231. The first transmission port 231 is configured to send the fourth optical signal to the peer optical module.

In this embodiment, when the first primary port 211 is connected to the modulator 203, and the third primary port 213 is connected to the optical splitter 202, the third optical signal is the first service optical signal having the second wavelength λ2, and the second optical signal is the first local oscillator optical signal having the second wavelength λ2.

In another example, if the third primary port 213 is connected to the modulator 203, and the first primary port 211 is connected to the optical splitter 202, the third optical signal is the first local oscillator optical signal having the second wavelength λ2, and the second optical signal is the first service optical signal having the second wavelength λ2.

When the optical module is in the second connection status shown in FIG. 3, and the optical module is used as the receive end of the optical signal, the second filter 242 is configured to receive, through the second transmission port 232, a seventh optical signal having the first wavelength λ1 from the peer optical module. The second filter 242 is configured to allow the seventh optical signal having the first wavelength λ1 to pass through the second filter 242. Specifically, the seventh optical signal having the first wavelength λ1 is reflected by the second filter 242, and is transmitted to the third secondary port 223. The third secondary port 223 is configured to send the seventh optical signal to the second primary port 212. The second primary port 212 is configured to send the seventh optical signal to the processor 204.

The second filter 242 shown in this embodiment transmits the third optical signal having the second wavelength λ2 and reflects the seventh optical signal having the first wavelength λ1, to filter the third optical signal and the seventh optical signal.

The first filter 241 is configured to receive, through the first transmission port 231, an eighth optical signal having the first wavelength λ1 from the peer optical module. The first filter 241 is configured to allow the eighth optical signal having the first wavelength λ1 to pass through the first filter 241. Specifically, the eighth optical signal having the first wavelength λ1 is reflected by the first filter 241, and is transmitted to the first secondary port 221. The first secondary port 221 is configured to send the eighth optical signal to the fourth primary port 214. The fourth primary port 214 is configured to send the eighth optical signal to the processor 204.

The first filter 241 shown in this embodiment transmits the fourth optical signal having the second wavelength λ2 and reflects the eighth optical signal having the first wavelength λ1 to filter the fourth optical signal and the eighth optical signal.

In this embodiment, in the seventh optical signal and the eighth optical signal, one channel of optical signals is the second service optical signal, and another channel of the optical signals is the second local oscillator optical signal. For example, the seventh optical signal is the second service optical signal, and the eighth optical signal is the second local oscillator optical signal. For another example, the seventh optical signal is the second local oscillator optical signal, and the eighth optical signal is the second service optical signal.

As shown above, the optical module in this embodiment can send the first service optical signal and the first local oscillator optical signal to the peer optical module, and can further receive the second service optical signal and the second local oscillator optical signal from the peer optical module. The following describes a connection manner between the optical module and the peer optical module shown in this embodiment.

Figure 5A:
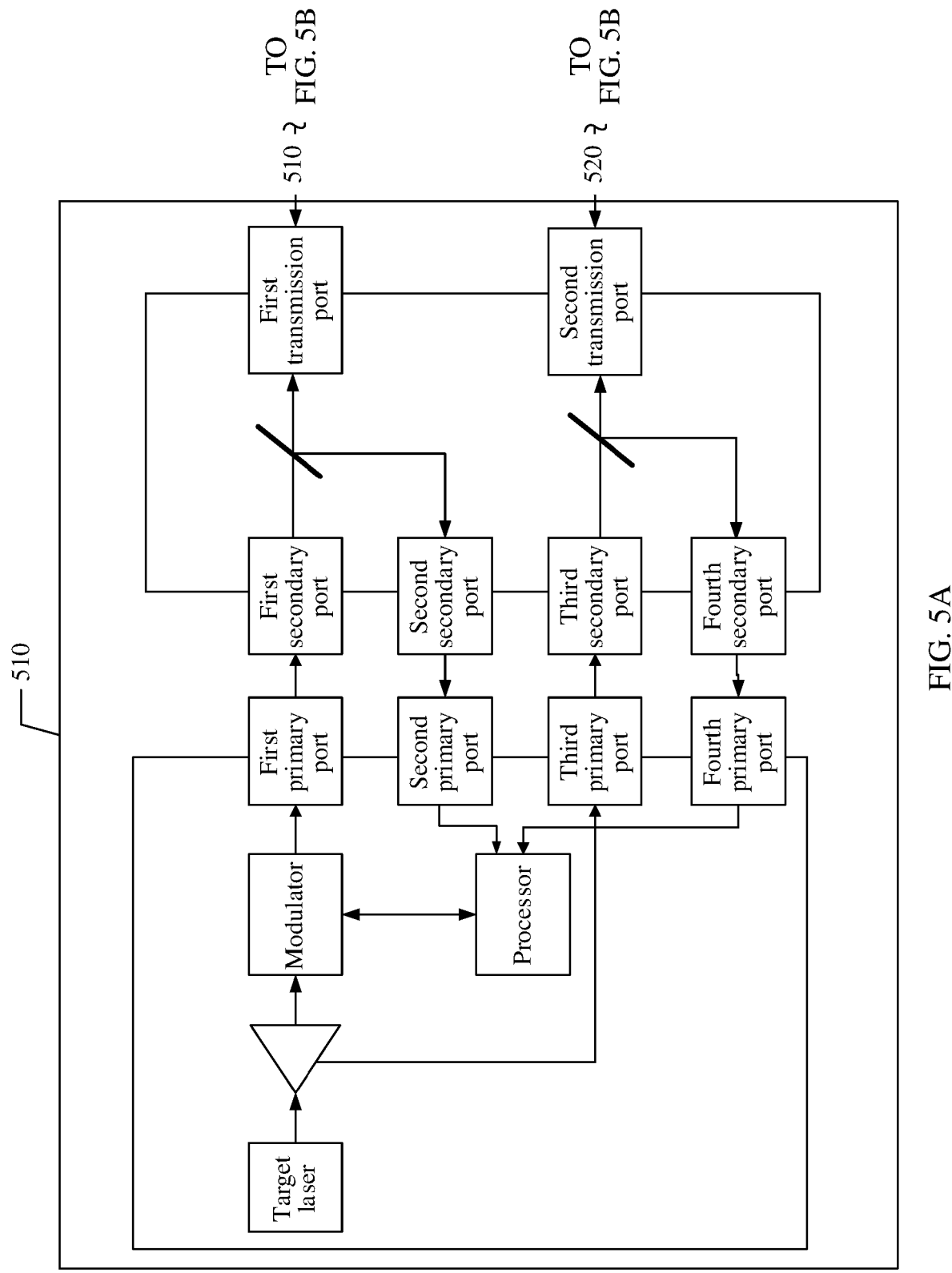
FIG. 5A and FIG. 5B are a schematic diagram of a structure of an embodiment of a coherent optical transmission system according to this disclosure.
Figure 5B:
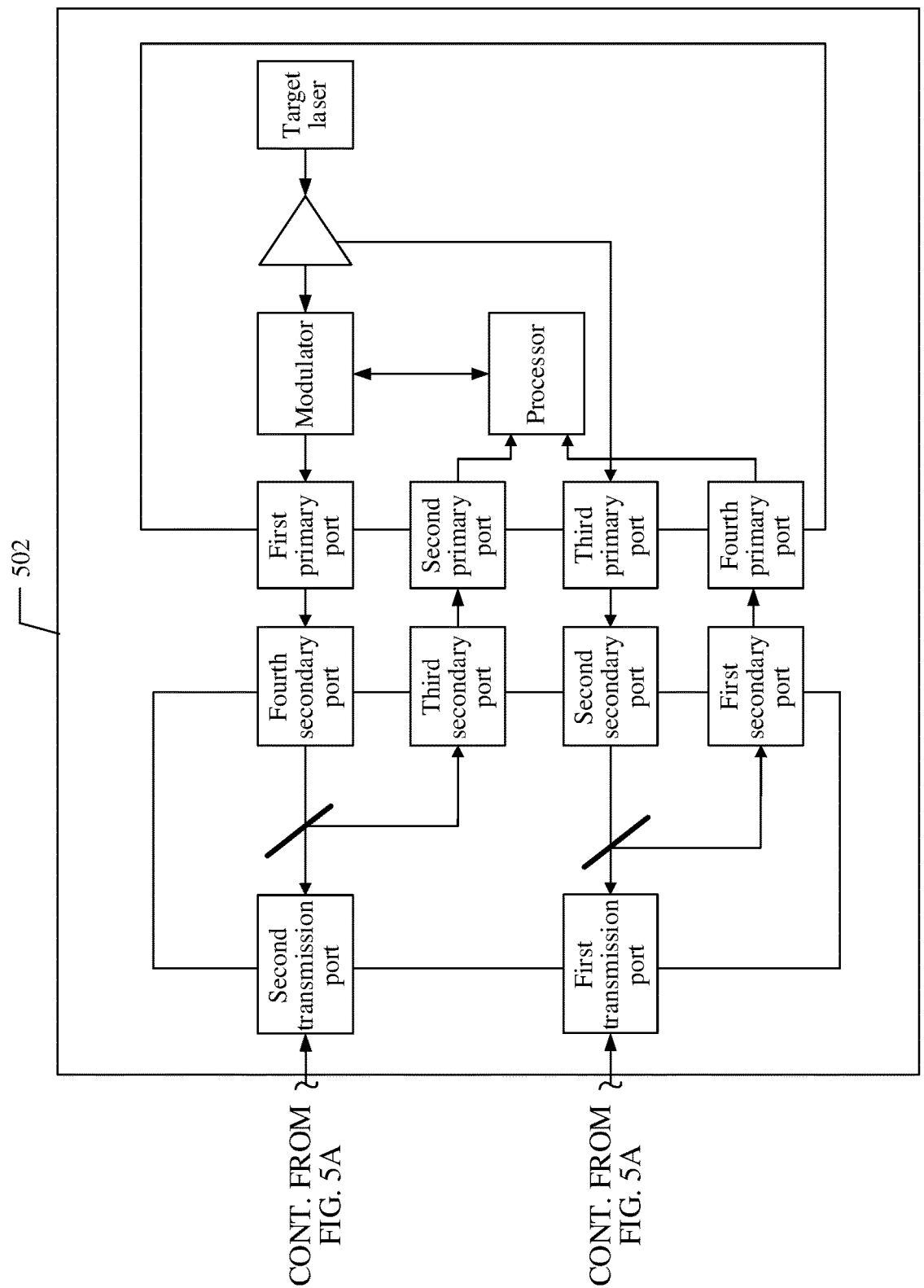

If the optical module shown in this embodiment is in the first connection status shown in FIG. 2, for a structure of a coherent optical transmission system including the optical module, refer to FIG. 5A and FIG. 5B. As shown in FIG. 5A and FIG. 5B, a first transmission port of an optical module 501 is connected to a second transmission port of a peer optical module 502 through a first duplex optical fiber 510. Specifically, both the first transmission port of the optical module 501 and the second transmission port of the peer optical module 502 are optical fiber connectors. Two ends of the first duplex optical fiber 510 are connected to the optical fiber connectors. Therefore, two ends of the first duplex optical fiber 510 can be separately inserted into the first transmission port of the optical module 501 and the second transmission port of the peer optical module 502.

The second transmission port of the optical module 501 and the first transmission port of the peer optical module 502 are connected through a second duplex optical fiber 520. For a specific connection manner description, refer to the description of a connection manner between the first transmission port of the optical module 501 and the second transmission port of the peer optical module 502. Details are not described in this embodiment.

The optical module 501 in this embodiment sends a first service optical signal to the peer optical module 502 through the first duplex optical fiber 510, and sends a first local oscillator optical signal to the peer optical module 502 through the second duplex optical fiber 520. The optical module 501 receives a second service optical signal from the peer optical module 502 through the first duplex optical fiber 510, and receives the second local oscillator optical signal from the peer optical module 502 through the second duplex optical fiber 520.

The following describes an optional structure of the first duplex optical fiber 510. It should be noted that the description of the first duplex optical fiber 510 in this embodiment is an optional example, and is not limited. As long as the first duplex optical fiber 510 can send the first service optical signal from the optical module 501 to the peer optical module 502, and the first duplex optical fiber 510 can send the second service optical signal from the peer optical module 502 to the optical module 501.

The first duplex optical fiber 510 shown in this embodiment includes a first sub-optical fiber and a second sub-optical fiber that are coupled to each other. Two ends of the first sub-optical fiber and the second sub-optical fiber are respectively connected to the first transmission port of the optical module 501 and the second transmission port of the peer optical module 502. The first sub-optical fiber is configured to transmit the first service optical signal. The second sub-optical fiber is configured to transmit the second service optical signal. For a description of a specific structure of the second duplex optical fiber 520, refer to the description of the structure of the first duplex optical fiber 510. Details are not described in this embodiment.

In this embodiment, a connection manner between the optical module and the peer optical module when the optical module is in the second connection status shown in FIG. 3 is not described in detail, provided that the optical module and the peer optical module are connected through two duplex optical fibers.

Figure 6:
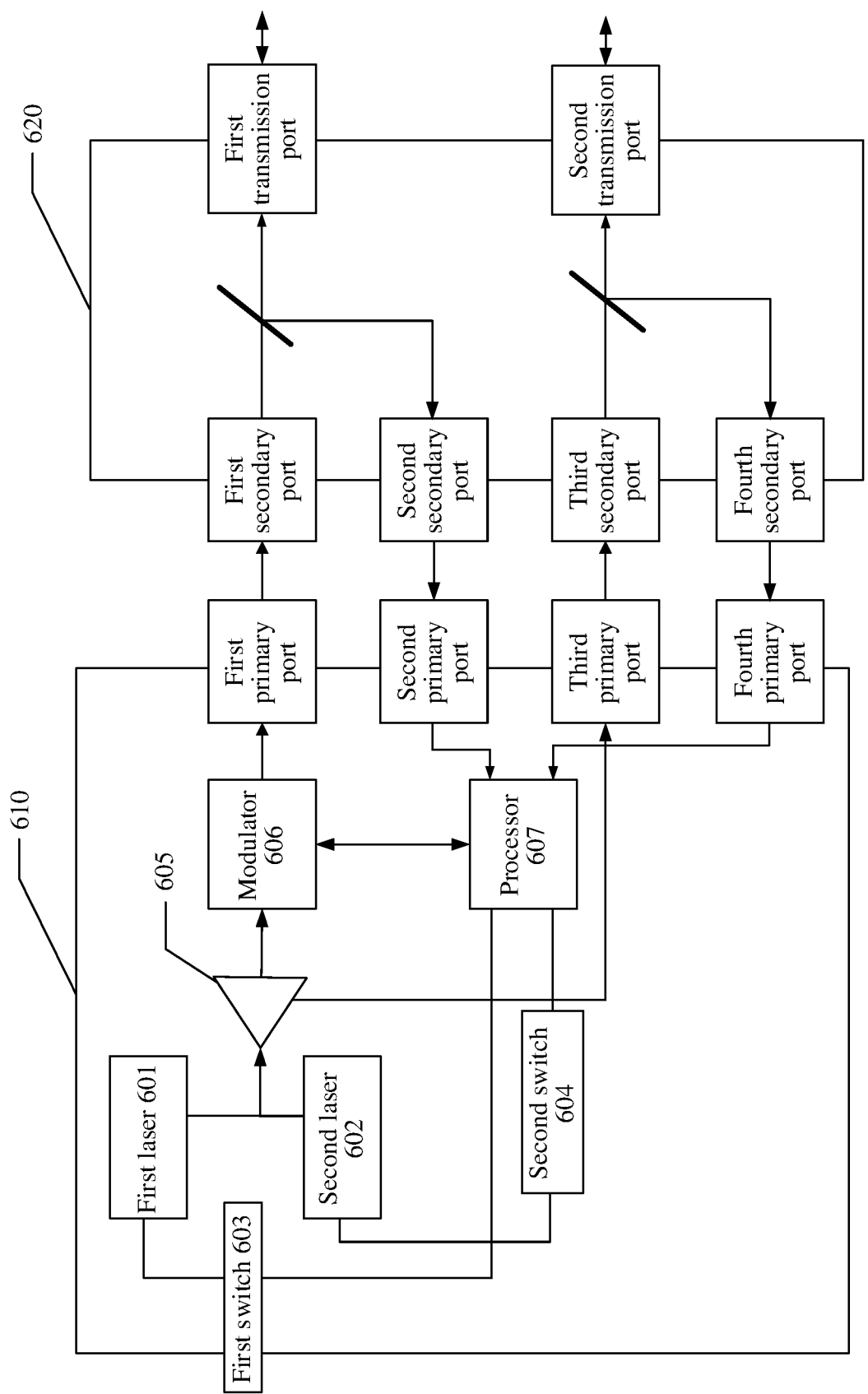
FIG. 6 is a schematic diagram of a structure of a third embodiment of an optical module according to this disclosure.

In embodiments shown in FIG. 2 to FIG. 5B, a wavelength-tunable laser is used an example in which a laser is configured to send a to-be-split optical signal. With reference to a case in which the laser included in an optical module shown in FIG. 6 is a wavelength-untunable laser, a description is provided as to how to adjust the wavelength of the optical signal sent by the optical module.

A processing component 610 shown in this embodiment includes a first laser 601 and a second laser 602, where a first switch 603 is connected between the first laser and a processor 607, and a second switch 604 is connected between the second laser 602 and the processor 607. The processor 607 shown in this embodiment is configured to control the first switch 603 and the second switch 604 to switch off. For specific descriptions of the processor 607, refer to the embodiment shown in FIG. 2. Details are not described in this embodiment.

The first laser 601 and the second laser 602 shown in this embodiment are configured to send to-be-split optical signals having different wavelengths. For example, the first laser 601 is configured to send a to-be-split optical signal having a first wavelength $\lambda 1$, and the second laser 602 is configured to send the to-be-split optical signal having a second wavelength $\lambda 2$. A value of the first wavelength $\lambda 1$ and a specific value of the second wavelength $\lambda 2$ are not limited in this embodiment, provided that the value of the first wavelength $\lambda 1$ and the value of the second wavelength $\lambda 2$ are different from each other.

If the optical module needs to send, based on a networking requirement, a first service optical signal having a first wavelength $\lambda 1$ and a first local oscillator optical signal, the processing component 610 and the plug component 620 are in a first connection status, the processor 607 is configured to control the first switch 603 to enable a path between the first laser 601 and the processor 607, so that the processor 607 supplies power to the first laser 601 through the path between the first laser 601 and the processor 607. Therefore, the to-be-split optical signal having the first wavelength $\lambda 1$ is emitted by the first laser 601.

This embodiment is described by using an example in which the processor 607 is connected between the first laser 601 and a power supply, and that the processor 607 supplies power to the first laser 601. Optionally, in another example, the first switch 603 may also be connected between the power supply and the first laser 601, and the first switch 603 is further connected to the processor 607. When the first switch 603 is on, the power supply may supply power to the first laser 601 through the path between the power supply and the first laser 601, which is not specifically limited in this embodiment.

For a description of a specific process in which based on the to-be-split optical signal that is sent by the first laser and that has the first wavelength $\lambda 1$, the optical module sends the first service optical signal and the first local oscillator optical signal that have the first wavelength $\lambda 1$ to the peer optical module, refer to the embodiment shown in FIG. 2. Details are not described in this embodiment.

The processor 607 is further configured to control the second switch 604 to disable a path between the second laser 602 and the processor 607 so that the second laser 602 does not send an optical signal.

For specific descriptions of the first connection status and the plug component 620, refer to the embodiment shown in FIG. 2. Details are not described in this embodiment.

It should be noted that, in this embodiment, an example in which the processing component includes two lasers is used as an example for description. In another example, the processing component may also include more than two lasers, so that the processing component can emit to-be-split optical signals with more wavelengths. In this way, an application range of the optical module shown in this embodiment is effectively improved.

Figure 7:
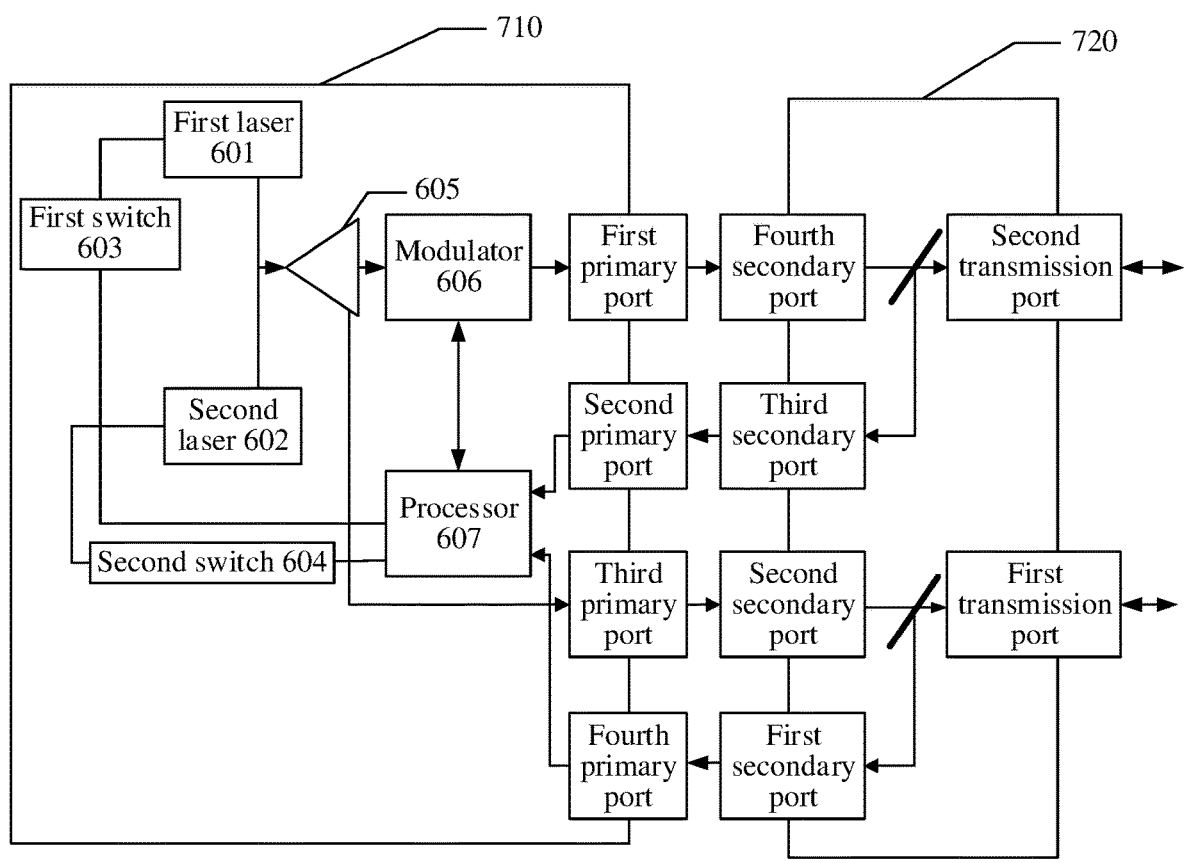
FIG. 7 is a schematic diagram of a structure of a fourth embodiment of an optical module according to this disclosure.

With reference to FIG. 7, the following describes a process in which the optical module adjusts wavelengths of the first service optical signal and the first local oscillator optical signal when the optical module is in a second connection status.

For specific descriptions of a processing component 710 and a plug component 720 included in the optical module shown in FIG. 7, refer to the embodiment shown in FIG. 6. Details are not described in this embodiment.

In this embodiment, if the optical module needs to send, based on a networking requirement, a first service optical signal and a first local oscillator optical signal that have a second wavelength $\lambda 2$, the processing component 710 and the plug component 720 are in a second connection status. The processor 607 is configured to control the first switch 603 to disable a path between the first laser 601 and the processor 607, so that the first laser 601 does not send an optical signal.

The processor 607 is further configured to control the second switch 604 to enable a path between the second laser 602 and the processor 607 so that the processor 607 can supply power to the second laser 602, and the second laser 602 may send a to-be-split optical signal having a second wavelength $\lambda 2$.

For specific descriptions of the second connection status, refer to the embodiment shown in FIG. 3. Details are not described in this embodiment.

For a description of a specific process in which based on the to-be-split optical signal that is sent by the second laser and that has the second wavelength $\lambda 2$, the optical module sends the first service optical signal and the first local oscillator optical signal that have the second wavelength $\lambda 2$ to the peer optical module, refer to the embodiment shown in FIG. 3. Details are not described in this embodiment.

Structures of the optical module shown in FIG. 6 and FIG. 7 are used. Because a laser included in the optical module is a laser whose wavelength cannot be adjusted, costs of the optical module are effectively reduced.

The following describes beneficial effects of the optical module provided in this application.

A wavelength of the optical module shown in this application may be adjusted based on different networking requirements. For example, if the networking requirement is that an optical module located at location E needs to send the first service optical signal and a first local oscillator optical signal that have a first wavelength $\lambda 1$, the peer optical module connected to the optical module is located at location F, and the peer optical module needs to send the second service optical signal and a second local oscillator optical signal that have the second wavelength $\lambda 2$ to the optical module, the optical module located at location E may be controlled to be in the first connection status, and the peer optical module located at location F is controlled to be in the second connection status, so that the optical modules located at different locations can send optical signals with different wavelengths without replacing the optical modules.

By using the optical module described in this disclosure, the processing component and the plug component may be produced in batches at delivery, and the produced processing component and the plug component do not need to be distinguished. For example, a structure of the optical module deployed at location E is identical as that of the optical module deployed at location F. If the optical module needs to be deployed at location E, the optical module is controlled to be in the first connection status during networking. For another example, if the optical module needs to be deployed at location F, the optical module needs to be controlled to be in the second connection status during networking. It can be learned that difficulty of producing an optical module is effectively reduced.

After the networking of the optical module succeeds, if wavelengths of a service optical signal and a local oscillator optical signal that are sent by the optical module need to be changed, the optical module does not need to be replaced, and only a connection status of the optical module needs to be changed, thereby effectively improving a difficulty of maintaining the optical module and reducing maintenance costs.

Figure 8:
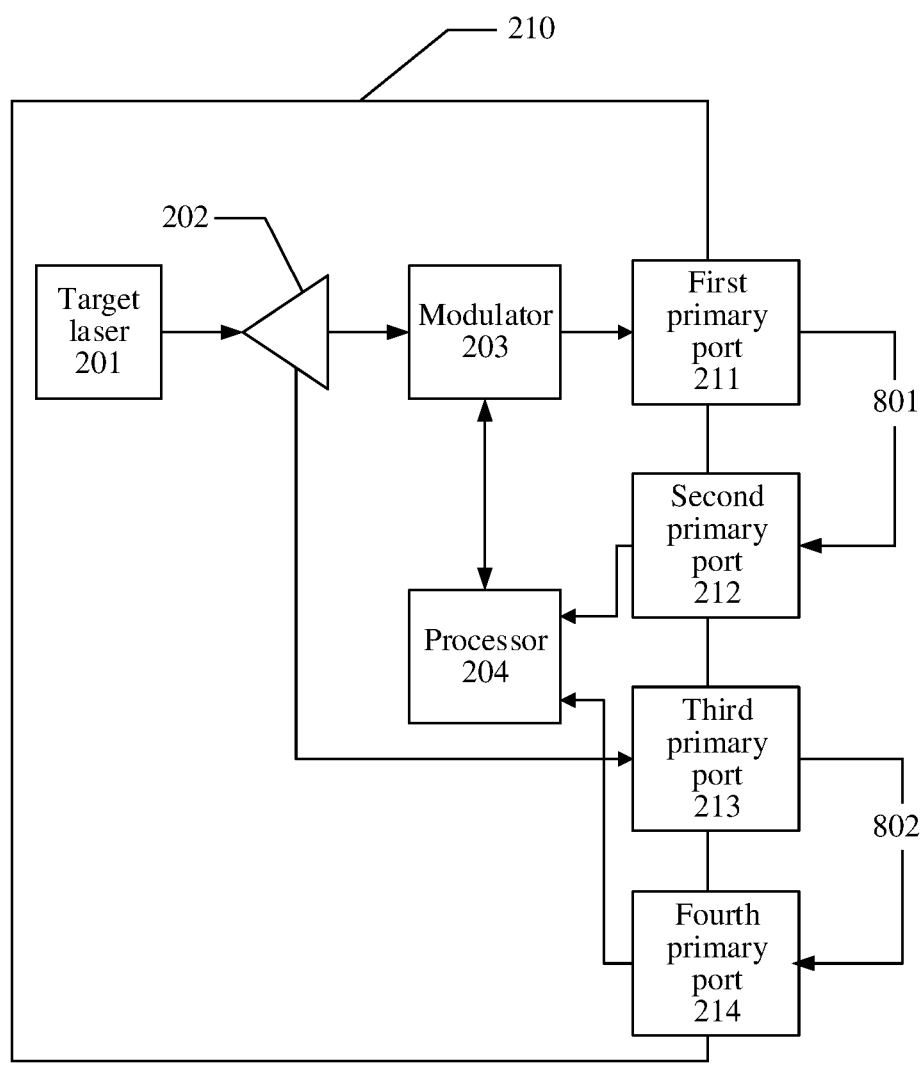
FIG. 8 is an example diagram of a structure of a processing component for implementing self-loop detection according to this disclosure.

The processing component provided in this disclosure can further implement self-loop detection. For specific descriptions, refer to FIG. 8.

To implement the self-loop detection on the processing component, the first primary port 211 is connected to the second primary port 212 through a first optical fiber 801, and the third primary port 213 is connected to the fourth primary port 214 through a second optical fiber 802.

The first primary port 211 can send a first service optical signal from the modulator 203 to the processor 204 successively through the first optical fiber 801 and the second primary port 212. For specific descriptions of the first service optical signal, refer to the embodiment shown in FIG. 2. Details are not described in this embodiment.

The third primary port 213 can send the first local oscillator optical signal from the optical splitter 202 to the processor 204 successively through the second optical fiber 802 and the fourth primary port 214. For specific descriptions of the first local oscillator optical signal, refer to the embodiment shown in FIG. 2. Details are not described in this embodiment.

When receiving the first service optical signal and the first local oscillator optical signal, the processor 204 may perform coherent detection on the first service optical signal based on the first local oscillator optical signal, to implement the self-loop detection on the processing component 210. For specific descriptions of the coherent detection, refer to the embodiment shown in FIG. 2. Details are not described in this embodiment.

It can be learned that, through the self-loop detection shown in this embodiment, if the processor 204 can normally receive the first service optical signal and the first local oscillator optical signal, it indicates that the processing component can normally send an optical signal. The processor can further determine, based on the coherent detection on the first service optical signal and the first local oscillator optical signal, whether signal strength, a phase, polarization, and a frequency of the first service optical signal and the first local oscillator optical signal that are sent by the processing component are normal.

This disclosure further provides an optical signal transmission method. A specific execution process of the optical signal transmission method is described below as an example with reference to FIG. 9.

Step 901: A processing component sends a first service optical signal and a first local oscillator optical signal to a plug component.

For specific descriptions in which the processing component shown in this embodiment sends the first service optical signal and the first local oscillator optical signal that have a first wavelength, refer to the embodiment shown in FIG. 2. Details are not described in this embodiment.

Step 902: The plug component sends, based on a first connection status, the first service optical signal and the first local oscillator optical signal that have a first wavelength to a peer optical module.

In this embodiment, if the plug component and the processing component are connected through the first connection status, a first filter included in the plug component can allow the first service optical signal having the first wavelength to be sent to a first transmission port, and a second filter included in the plug component can allow the first local oscillator optical signal having the first wavelength to be sent to a second transmission port. For a description of a specific process in which the first filter and the second filter transmit an optical signal having the first wavelength, refer to the embodiment shown in FIG. 2. Details are not described in this embodiment.

Step 903: The plug component receives a second service optical signal and a second local oscillator optical signal from the peer optical module.

Step 904: The plug component sends, based on the first connection status, the second service optical signal and the second local oscillator optical signal that have a second wavelength to the processing component.

In this embodiment, if the plug component is connected to the processing component through the first connection status, the first transmission port of the plug component can receive the second service optical signal having the second wavelength from the peer optical module, and the second transmission port of the plug component can receive the second local oscillator optical signal having the second wavelength from the peer optical module. For specific descriptions of the second service optical signal and the second local oscillator optical signal, refer to the embodiment shown in FIG. 2. Details are not described in this embodiment.

The first filter included in the plug component can allow the second service optical signal having the second wavelength to be sent to the processing component. The second filter included in the plug component can allow the second local oscillator optical signal having the second wavelength to be sent to the processing component. For a description of a specific process in which the first filter and the second filter transmit the optical signal having the second wavelength, refer to the embodiment shown in FIG. 2. Details are not described in this embodiment.

Step 905: The processing component performs coherent detection on the second service optical signal based on the second local oscillator optical signal.

For a description of a process in which the processing component performs the coherent detection on the second service optical signal based on the second local oscillator optical signal, refer to the embodiment shown in FIG. 2. Details are not described in this embodiment.

Figure 9:
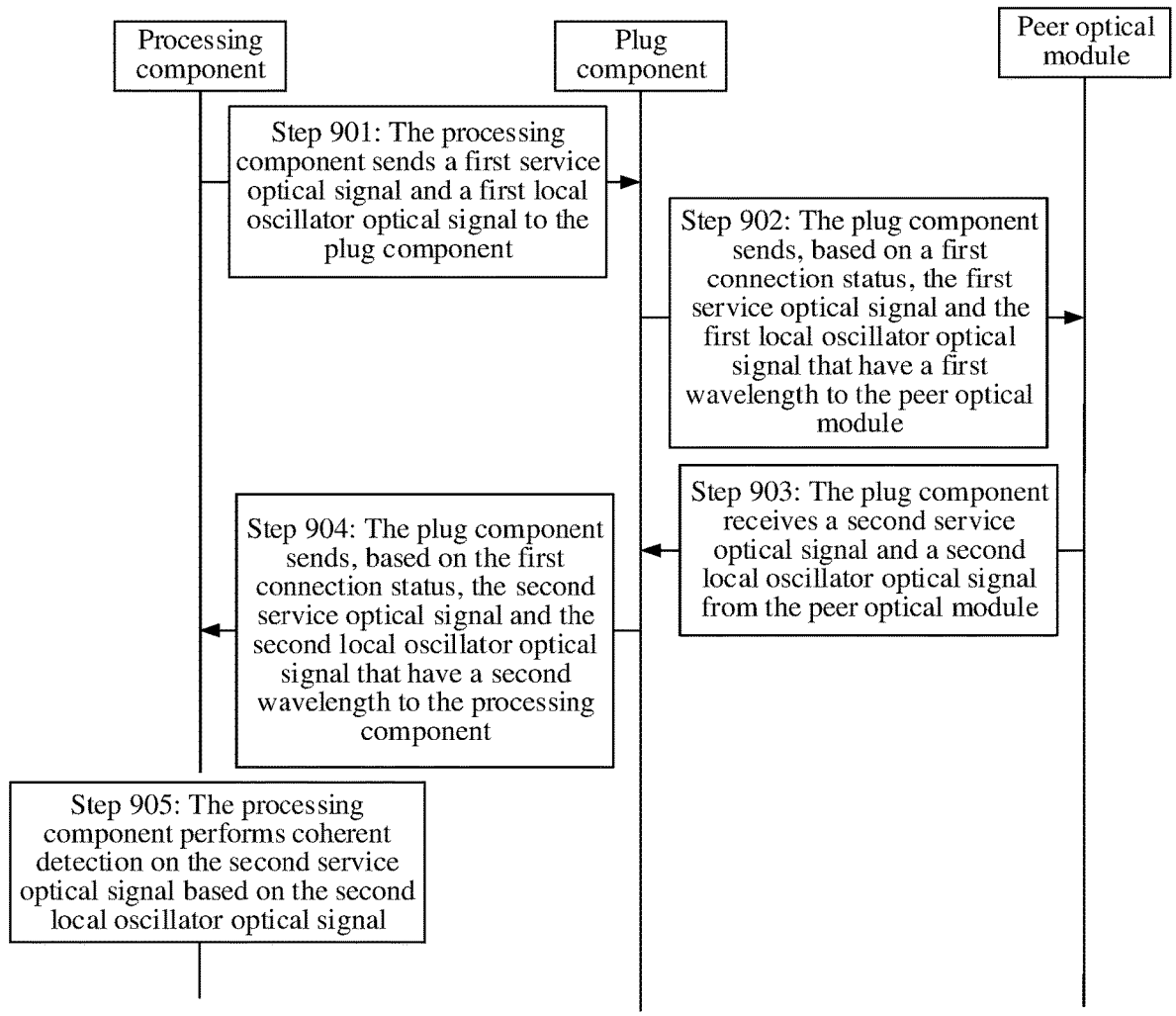
FIG. 9 is a schematic diagram of an execution procedure of a first embodiment of an optical signal transmission method according to this disclosure.
Figure 10:
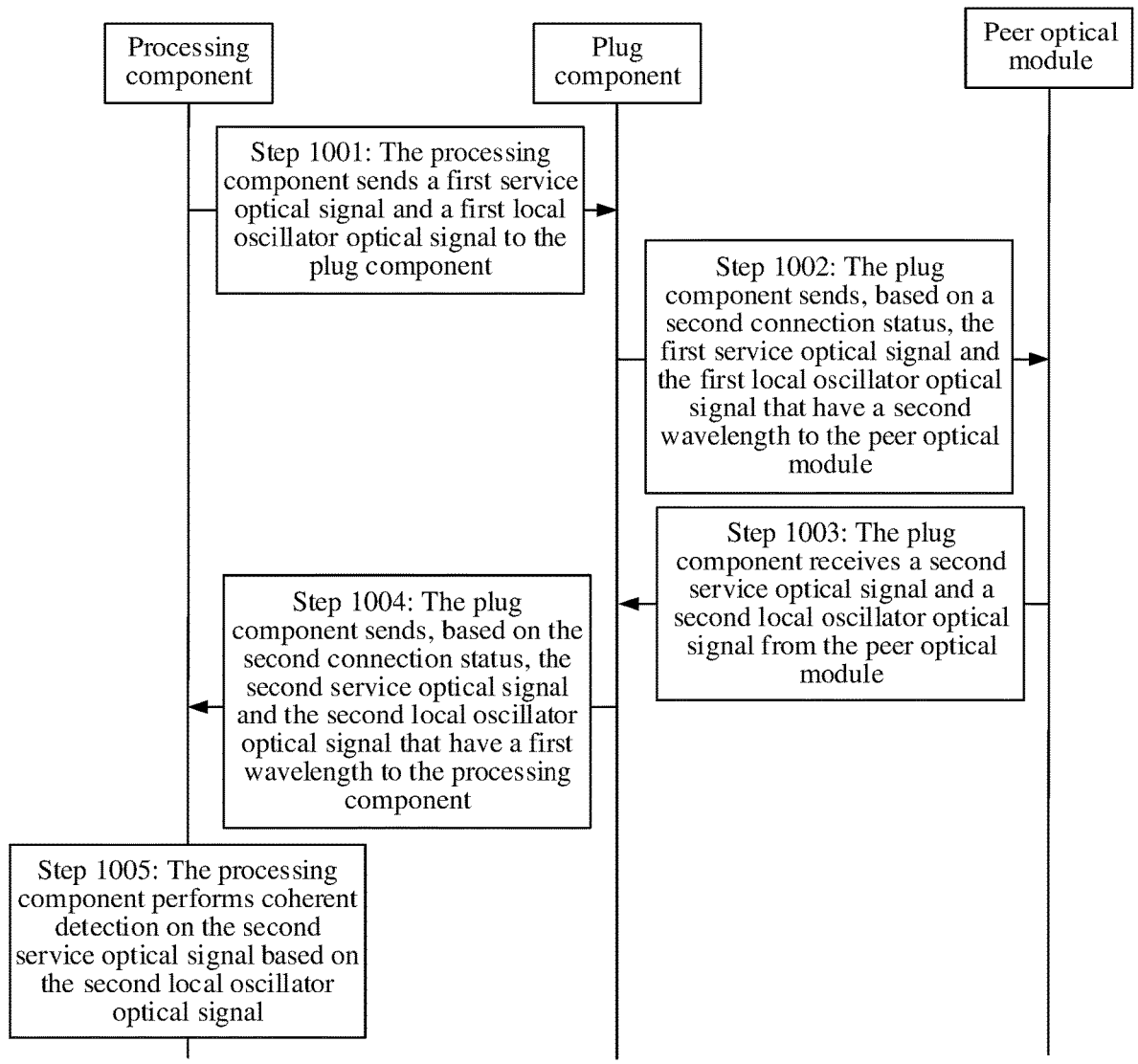
FIG. 10 is a schematic diagram of an execution procedure of a second embodiment of an optical signal transmission method according to this disclosure.

In the embodiment shown in FIG. 9, an example in which the optical module is in the first connection status is used for description. The following describes a specific execution process of an optical signal transmission method when the optical module is in a second connection status with reference to FIG. 10.

Step 1001: A processing component sends a first service optical signal and a first local oscillator optical signal to a plug component.

For specific descriptions in which the processing component shown in this embodiment sends the first service optical signal and the first local oscillator optical signal that have a second wavelength, refer to the embodiment shown in FIG. 3. Details are not described in this embodiment.

Step 1002: The plug component sends, based on a second connection status, the first service optical signal and the first local oscillator optical signal that have a second wavelength to a peer optical module.

In this embodiment, if the plug component and the processing component are connected through the second connection status, a second filter included in the plug component can allow the first service optical signal having the second wavelength to be sent to a second transmission port, and a first filter included in the plug component can allow the first local oscillator optical signal having the second wavelength to be sent to a first transmission port. For a description of a specific process in which the first filter and the second filter transmit an optical signal having the second wavelength, refer to the embodiment shown in FIG. 3. Details are not described in this embodiment.

Step 1003: The plug component receives a second service optical signal and a second local oscillator optical signal from the peer optical module.

Step 1004: The plug component sends, based on the second connection status, the second service optical signal and the second local oscillator optical signal that have a first wavelength to the processing component.

In this embodiment, if the plug component is connected to the processing component through the second connection status, the second transmission port of the plug component can receive the second service optical signal having the first wavelength from the peer optical module, and the first transmission port of the plug component can receive the second local oscillator optical signal having the first wavelength from the peer optical module. For specific descriptions of the second service optical signal and the second local oscillator optical signal, refer to the embodiment shown in FIG. 3. Details are not described in this embodiment.

The second filter included in the plug component can allow the second service optical signal having the first wavelength to be sent to the processing component. The first filter included in the plug component can allow the second local oscillator optical signal having the first wavelength to be sent to the processing component. For a description of a specific process in which the first filter and the second filter transmit the optical signal having the first wavelength, refer to the embodiment shown in FIG. 3. Details are not described in this embodiment.

Step 1005: The processing component performs coherent detection on the second service optical signal based on the second local oscillator optical signal.

For a description of a specific execution process of step 1004 shown in this embodiment, refer to step 904 shown in FIG. 9. Details are not described in this embodiment.

The following describes beneficial effects of the optical signal transmission method provided in this disclosure.

According to the optical signal transmission method shown in this application, wavelengths of optical signals sent by an optical module and received optical signals may be adjusted based on different networking requirements. For example, if the networking requirement is that an optical module located at location E needs to send the first service optical signal and a first local oscillator optical signal that have a first wavelength λ1, the peer optical module connected to the optical module is located at location F, and the peer optical module needs to send the second service optical signal and a second local oscillator optical signal that have the second wavelength λ2 to the optical module, the optical module located at location E may be controlled to be in the first connection status, and the peer optical module located at location F may be controlled to be in the second connection status, so that the optical modules located at different locations can send optical signals with different wavelengths without replacing the optical modules.

After the networking of the optical module succeeds, if wavelengths of a service optical signal and a local oscillator optical signal that are sent by the optical module need to be changed, the optical module does not need to be replaced, and only a connection status of the optical module needs to be changed, thereby effectively improving a difficulty of maintaining the optical module and reducing maintenance costs.

Figure 11:
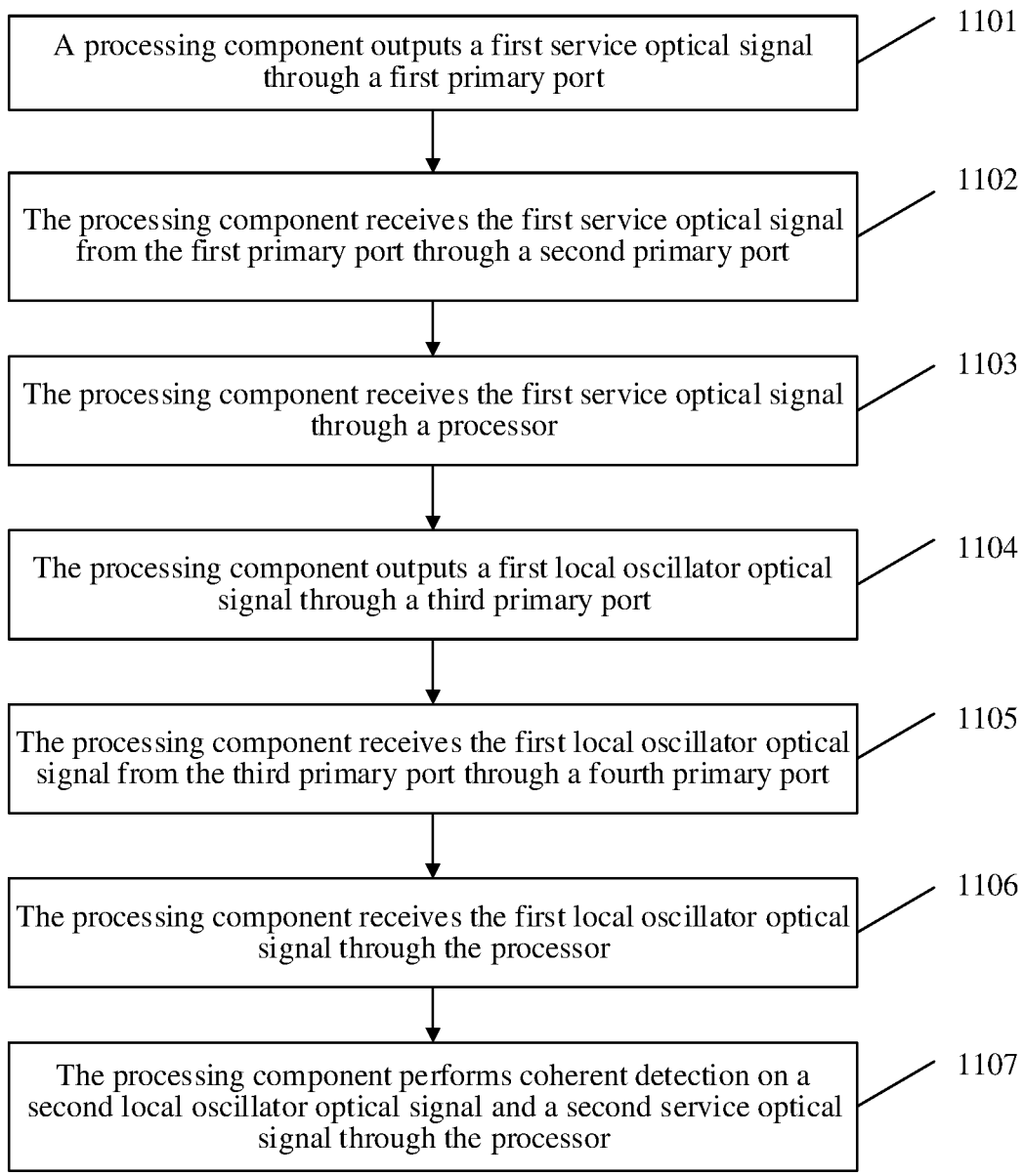
FIG. 11 is an example diagram of an execution procedure of an embodiment of self-loop detection according to this disclosure.

This disclosure further provides a self-loop detection method. For a specific execution process, refer to FIG. 11.

Step 1101: A processing component outputs a first service optical signal through a first primary port.

For a description of a specific process in which the processing component in this embodiment outputs the first service optical signal through the first primary port, refer to the embodiment shown in FIG. 2 or FIG. 3. Details are not described in this embodiment.

Step 1102: The processing component receives the first service optical signal from the first primary port through a second primary port.

In this embodiment, the first primary port and the second primary port are connected through a first optical fiber, and the second primary port may receive, through the first optical fiber, the first service optical signal from the first primary port. For details, refer to the embodiment shown in FIG. 8. Details are not described in this embodiment.

Step 1103: The processing component receives the first service optical signal through a processor.

Step 1104: The processing component outputs a first local oscillator optical signal through a third primary port.

For a description of a specific process in which the processing component in this embodiment outputs the first local oscillator optical signal through the third primary port, refer to the embodiment shown in FIG. 2 or FIG. 3. Details are not described in this embodiment.

An execution time sequence between step 1101 and step 1104 is not limited in this embodiment.

Step 1105: The processing component receives the first local oscillator optical signal from the third primary port through a fourth primary port.

In this embodiment, the third primary port and the fourth primary port are connected through a second optical fiber, and the fourth primary port may receive, by using the second optical fiber, the first local oscillator optical signal from the third primary port. For details, refer to the embodiment shown in FIG. 8. Details are not described in this embodiment.

Step 1106: The processing component receives the first local oscillator optical signal through the processor.

An execution time sequence between step 1103 and step 1106 is not limited in this embodiment.

Step 1107: The processing component performs coherent detection on the second local oscillator optical signal and the second service optical signal through the processor.

In this embodiment, the processor implements self-loop detection by performing the coherent detection on the second local oscillator optical signal and the second service optical signal. For specific descriptions of the self-loop detection, refer to the embodiment shown in FIG. 8. Details are not described in this embodiment.

It can be learned that, through the self-loop detection shown in this embodiment, if the processor can normally receive the first service optical signal and the first local oscillator optical signal, it indicates that the processing component can normally send an optical signal. The processor can further determine, based on the coherent detection on the first service optical signal and the first local oscillator optical signal, whether signal strength, a phase, polarization, and a frequency of the first service optical signal and the first local oscillator optical signal that are sent by the processing component are normal.

This disclosure further provides a coherent optical transmission system. The coherent optical transmission system shown in this embodiment includes an optical module and a peer optical module. The optical module shown in this embodiment is configured to send a first service optical signal and a first local oscillator optical signal to the peer optical module. The optical module is further configured to receive a second service optical signal and a second local oscillator optical signal from the peer optical module. For a specific structure of the optical module, refer to FIG. 2 or FIG. 3, and details are not described again.

The foregoing detailed descriptions are merely illustrative of technical solutions provided by various embodiments and are not intended to limit the technical solutions or descriptions of embodiments. The foregoing embodiments may still be modified, and some technical features thereof may be equivalently replaced. However, these modifications or replacements do not deviate from the spirit and scope of the technical solutions, which are set forth in the accompanying claims.

What is claimed is:

1. An optical module, comprising:
a processing component including:
a target laser, an optical splitter connected to the target laser, and a modulator connected to the optical splitter, the optical splitter being configured to receive a to-be-split optical signal from the target laser and to split the to-be-split optical signal to obtain a first local oscillator optical signal and a to-be-modulated optical signal, the modulator being configured to receive the to-be-modulated optical signal and to modulate a service signal on the to-be-modulated optical signal to obtain a first service optical signal; or
a first laser configured to send a first to-be-split optical signal having a first wavelength, a second laser configured to send a second to-be-split optical signal having a second wavelength different from the first wavelength, a first switch, a second switch, a processor, an optical splitter connected to the first laser and the second laser, and a modulator connected to the optical splitter, wherein:
the first switch is connected between the first laser and the processor, the second switch is connected between the second laser and the processor;
the processor is configured to control the first switch and the second switch to select between the first to-be-split optical signal and the second to-be-split optical signal;
the optical splitter is configured to receive either the first to-be-split optical signal from the first laser or the second to-be-split optical signal from the second laser and to split the first or second to-be-split optical signal to obtain a first local oscillator optical signal and a to-be-modulated optical signal; and
the modulator is configured to receive the to-be-modulated optical signal and to modulate a service signal on the to-be-modulated optical signal to obtain a first service optical signal;
a plurality of primary ports;
a switch; and
a plug component comprising a plurality of filters connected to a plurality of secondary ports, wherein:
the switch is configured to switch the optical module between a first connection status and a second connection status, the first connection status and the second connection status being different statuses of connections between the plurality of primary ports and the plurality of secondary ports, whereby a common primary port connects to a different secondary port in accordance with the connection status to which the optical module has been switched;
the plurality of filters is coupled to the processing component to send the first service optical signal and the first local oscillator optical signal from the processing component to a peer optical module, and to send a second service optical signal and a second local oscillator optical signal from the peer optical module to the processing component, the processing component being configured to perform coherent detection on the second service optical signal based on the second local oscillator optical signal;
wherein when the optical module is in the first connection status, the first service optical signal sent by the plurality of filters has a same first wavelength as the first local oscillator optical signal sent by the plurality of filters, and the second service optical signal sent by the plurality of filters has a same second wavelength as the second local oscillator optical signal sent by the plurality of filters; and when the optical module is in the second connection status, the first service optical signal sent by the plurality of filters has the same second wavelength as the first local oscillator optical signal sent by the plurality of filters, and the second service optical signal sent by the plurality of filters has the same first wavelength as the second local oscillator optical signal sent by the plurality of filters;

wherein the first wavelength is different from the second wavelength.

2. The optical module according to claim 1, wherein the plurality of primary ports comprise a first primary port, a second primary port, a third primary port, and a fourth primary port, and the plurality of secondary ports comprise a first secondary port, a second secondary port, a third secondary port, and a fourth secondary port;

the first connection status provides the first primary port is connected to the first secondary port, the second primary port is connected to the second secondary port, the third primary port is connected to the third secondary port, and the fourth primary port is connected to the fourth secondary port; and the second connection status provides the first primary port is connected to the fourth secondary port, the second primary port is connected to the third secondary port, the third primary port is connected to the second secondary port, and the fourth primary port is connected to the first secondary port.

3. The optical module according to claim 2, wherein the plug component comprises a first filter and a second filter, the first filter is connected to the first secondary port and the second secondary port, the second filter is connected to the third secondary port and the fourth secondary port, the first filter is further connected to a first transmission port, the second filter is further connected to a second transmission port, and the first transmission port and the second transmission port are separately connected to the peer optical module through an optical fiber.

4. The optical module according to claim 3, wherein:
the first filter is configured:
to receive, through the first secondary port, a first optical signal having a first wavelength from the first primary port; and
to send the first optical signal to the first transmission port, the first transmission port being configured to send the first optical signal to the peer optical module;
the second filter is configured:
to receive, through the third secondary port, a second optical signal having the first wavelength from the third primary port; and
to send the second optical signal to the second transmission port, the second transmission port being configured to send the second optical signal to the peer optical module; and
in the first optical signal and the second optical signal, one channel of optical signals is the first service optical signal, and another channel of the optical signals is the first local oscillator optical signal.

5. The optical module according to claim 3, wherein:
the second filter is configured to receive, through the fourth secondary port, a third optical signal from the first primary port, the third optical signal having a second wavelength;
the second filter is configured to send the third optical signal to the second transmission port, and the second transmission port is configured to send the third optical signal to the peer optical module;
the first filter is configured to receive, through the second secondary port from the third primary port, a fourth optical signal having the second wavelength;
the first filter is further configured to send the fourth optical signal to the first transmission port, and the first transmission port is configured to send the fourth optical signal to the peer optical module; and
in the third optical signal and the fourth optical signal, one channel of optical signals is the first service optical signal, and another channel of the optical signals is the first local oscillator optical signal.

6. The optical module according to claim 3, wherein:
the first filter is configured to receive, through the first transmission port from the peer optical module, a fifth optical signal having a second wavelength;
the first filter is configured to send the fifth optical signal to the second secondary port; and
the processing component is configured to receive the fifth optical signal from the second secondary port through the second primary port;
the second filter is configured to receive, through the second transmission port from the peer optical module, a sixth optical signal having the second wavelength;
the second filter is configured to send the sixth optical signal to the fourth secondary port;
the processing component is configured to receive the sixth optical signal from the fourth secondary port through the fourth primary port; and
in the fifth optical signal and the sixth optical signal, one channel of optical signals is the second service optical signal, and another channel of the optical signals is the second local oscillator optical signal.

7. The optical module according to claim 3, wherein:
the second filter is configured to receive, from the peer optical module through the second transmission port, a seventh optical signal having a first wavelength;
the second filter is configured to send the seventh optical signal to the third secondary port; and
the processing component is configured to receive the seventh optical signal from the third secondary port through the second primary port;
the first filter is configured to receive, from the peer optical module through the first transmission port, an eighth optical signal having the first wavelength;
the first filter is configured to send the eighth optical signal to the first secondary port;
the processing component is configured to receive the eighth optical signal from the first secondary port through the fourth primary port; and
in the seventh optical signal and the eighth optical signal, one channel of optical signals is the second service optical signal, and another channel of the optical signals is the second local oscillator optical signal.

8. The optical module according to claim 1, wherein when the processing component comprises the target laser, the optical splitter, the modulator, and the processor, the modulator is connected to one of the plurality of primary ports, the optical splitter is connected to one of the plurality of primary ports, the processor is connected to two of the plurality of primary ports, and the primary port connected to the modulator, the primary port connected to the optical splitter, and the primary port connected to the processor are different from each other;

the optical splitter is further configured to send the first local oscillator optical signal to the primary port connected to the optical splitter, the modulator is configured to send the first service optical signal to the primary port connected to the modulator; and the processor is configured to respectively receive the second service optical signal and the second local oscillator optical signal from the plug component through two primary ports connected to the processor, and to perform the coherent detection on the second service optical signal based on the second local oscillator optical signal.

9. The optical module according to claim 8, wherein when the processing component comprises the first laser and the second laser, the first switch and the second switch;

when the processing component and the plug component are connected through the first connection status, the processor is configured to control the first switch to enable a path between the first laser and the processor, and to control the second switch to disable the path between the second laser and the processor, wherein the first laser as the target laser is configured to emit the to-be-split optical signal having the first wavelength; and when the processing component and the plug component are connected through the second connection status, the processor is configured to control the first switch to disable the path between the first laser and the processor, and to control the second switch to enable the path between the second laser and the processor, wherein the second laser as the target laser is configured to emit the to-be-split optical signal having the second wavelength, and the first wavelength and the second wavelength are different from each other.

10. The optical module according to claim 1, wherein each primary port and each secondary port are optical fiber adapters, and the optical module further comprises a plurality of optical fiber connecting pieces; and each optical fiber connecting piece comprises an optical fiber, two ends of the optical fiber are respectively connected to a first optical fiber connector and a second optical fiber connector, the first optical fiber connector is configured to be inserted into one of the plurality of primary ports, and the second optical fiber connector is configured to be inserted into one of the plurality of secondary ports.

11. The optical module according to claim 1, wherein each primary port is an optical fiber adapter, each secondary port is an optical fiber connector, and one of the plurality of secondary ports is inserted into one of the plurality of primary ports.

12. The optical module according to claim 1, wherein the optical module and the peer optical module are connected through a first duplex optical fiber and a second duplex optical fiber, the first duplex optical fiber is configured to transmit the first service optical signal and the second service optical signal, and the second duplex optical fiber is configured to transmit the first local oscillator optical signal and the second local oscillator optical signal.

13. The optical module according to claim 1, wherein the coherent detection is a self-homodyne detection (SHD) detection.

14. An optical signal transmission method is applied to an optical module, the optical module comprising:

a processing component including: a target laser, an optical splitter connected to the target laser, and a modulator connected to the optical splitter, the optical splitter being configured to receive a to-be-split optical signal from the target laser and to split the to-be-split optical signal to obtain a first local oscillator optical signal and a to-be-modulated optical signal, the modulator being configured to receive the to-be-modulated optical signal and to modulate a service signal on the to-be-modulated optical signal to obtain a first service optical signal; or a processing component including: a first laser configured to send a first to-be-split optical signal having a first wavelength, a second laser configured to send a second to-be-split optical signal having a second wavelength different from the first wavelength, a first switch, a second switch, a processor, an optical splitter connected to the first laser and the second laser, and a modulator connected to the optical splitter, wherein:

the first switch is connected between the first laser and the processor, the second switch is connected between the second laser and the processor;

the processor is configured to control the first switch and the second switch to select between the first to-be-split optical signal and the second to-be-split optical signal;

the optical splitter is configured to receive either the first to-be-split optical signal from the first laser or the second to-be-split optical signal from the second laser and to split the first or second to-be-split optical signal to obtain a first local oscillator optical signal and a to-be-modulated optical signal; and the modulator is configured to receive the to-be-modulated optical signal and to modulate a service signal on the to-be-modulated optical signal to obtain a first service optical signal;

the optical module further including a plug component comprising a plurality of filters connected to a plurality of secondary ports, the processing component comprising a plurality of primary ports, and the optical module is switchable between a first connection status and a second connection status, the first connection status and the second connection status being different statuses of connections between the plurality of primary ports and the plurality of secondary ports, whereby a common primary port connects to a different secondary port in accordance with the connection status to which the optical module has been switched; the method comprising:

sending a first service optical signal and a first local oscillator optical signal from the processing component to a peer optical module through the plurality of filters;

sending a second service optical signal and a second local oscillator optical signal from the peer optical module to the processing component through the plurality of filters;

performing, by the processing component, coherent detection on the second service optical signal based on the second local oscillator optical signal;

wherein when the optical module is in the first connection status, the first service optical signal sent by the plurality of filters has a same first wavelength as the first local oscillator optical signal sent by the plurality of filters, and the second service optical signal sent by the plurality of filters has a same second wavelength as the second local oscillator optical signal sent by the plurality of filters; and when the optical module is in the second connection status, the first service optical signal sent by the plurality of filters has the same second wavelength as the first local oscillator optical signal sent by the plurality of filters, and the second service optical signal sent by the plurality of filters has the same first wavelength as the second local oscillator optical signal sent by the plurality of filters;

wherein the first wavelength is different from the second wavelength.

15. A coherent optical transmission system, comprising:
an optical module; and
a peer optical module, wherein:
the optical module comprises a processing component and a plug component, the processing component including a plurality of primary ports and the plug component including a plurality of filters connected to a plurality of secondary ports; and
the optical module is switchable between a first connection status and a second connection status, wherein the first connection status and the second connection status are different statuses of connections between the plurality of primary ports and the plurality of secondary ports, whereby a common primary port connects to a different secondary port in accordance with the connection status to which the optical module has been switched;
the plurality of filters is coupled to the processing component to send a first service optical signal and a first local oscillator optical signal optical signal to a peer optical module, and to send a second service optical signal and a second local oscillator optical signal from the peer optical module to the processing component, the processing component being configured to perform coherent detection on the second service optical signal based on the second local oscillator optical signal;
wherein when the optical module is in the first connection status, the first service optical signal sent by the plurality of filters has a same first wavelength as the first local oscillator optical signal sent by the plurality of filters, and the second service optical signal sent by the plurality of filters has a same second wavelength as the second local oscillator optical signal sent by the plurality of filters; and
when the optical module is in the second connection status, the first service optical signal sent by the plurality of filters has the same second wavelength as the first local oscillator optical signal sent by the plurality of filters, and the second service optical signal sent by the plurality of filters has the same first wavelength as the second local oscillator optical signal sent by the plurality of filters;
wherein the first wavelength is different from the second wavelength.

16. The system according to claim 15, wherein the plurality of primary ports comprise a first primary port, a second primary port, a third primary port, and a fourth primary port, and the plurality of secondary ports comprise a first secondary port, a second secondary port, a third secondary port, and a fourth secondary port;
the first connection status provides the first primary port is connected to the first secondary port, the second primary port is connected to the second secondary port, the third primary port is connected to the third secondary port, and the fourth primary port is connected to the fourth secondary port; and
the second connection status provides the first primary port is connected to the fourth secondary port, the second primary port is connected to the third secondary port, the third primary port is connected to the second secondary port, and the fourth primary port is connected to the first secondary port.

17. The system according to claim 16, wherein the plug component comprises a first filter and a second filter, the first filter is connected to the first secondary port and the second secondary port, the second filter is connected to the third secondary port and the fourth secondary port, the first filter is further connected to a first transmission port, the second filter is further connected to a second transmission port, and the first transmission port and the second transmission port are separately connected to the peer optical module through an optical fiber.

18. The system according to claim 17, wherein the first filter is coupled to the first primary port through the first secondary port to receive a first optical signal having a first wavelength and to send the first optical signal to the first transmission port, and the first transmission port is configured to send the first optical signal to the peer optical module;
the second filter is coupled to the third primary port through the third secondary port to receive a second optical signal having the first wavelength and to send the second optical signal to the second transmission port, and the second transmission port is configured to send the second optical signal to the peer optical module; and
each of the first optical signal and the second optical signal includes one channel of optical signals as the first service optical signal and another channel of the optical signals as the first local oscillator optical signal.

19. The system according to claim 17, wherein the second filter is coupled to the first primary port through the fourth secondary port to receive a third optical signal having a second wavelength and to send the third optical signal to the second transmission port, and the second transmission port is configured to send the third optical signal to the peer optical module;
the first filter is coupled to the third primary port through the second secondary port to receive a fourth optical signal having the second wavelength and to send the fourth optical signal to the first transmission port, and the first transmission port is configured to send the fourth optical signal to the peer optical module; and
each of the third optical signal and the fourth optical signal includes one channel of optical signals as the first service optical signal and another channel of the optical signals as the first local oscillator optical signal.

20. The system according to claim 17, wherein the first filter is coupled to the peer optical module through the first transmission port to receive a fifth optical signal having a second wavelength and to send the fifth optical signal to the second secondary port, and the processing component is configured to receive the fifth optical signal from the second secondary port through the second primary port;
the second filter is coupled to the peer optical module through the second transmission port to receive a sixth optical signal having the second wavelength and to send the sixth optical signal to the fourth secondary port, and the processing component is configured to receive the sixth optical signal from the fourth secondary port through the fourth primary port; and
each of the fifth optical signal and the sixth optical signal includes one channel of optical signals as the second service optical signal and another channel of the optical signals as the second local oscillator optical signal.

* * * * *